(12) United States Patent
Smith et al.

(10) Patent No.: US 11,905,038 B2
(45) Date of Patent: *Feb. 20, 2024

(54) CONTOUR ENFORCEMENT FOR LINE ASSEMBLED FUSELAGE SEGMENTS

(71) Applicant: The Boeing Company, Chicago, IL (US)

(72) Inventors: Daniel R. Smith, Woodinville, WA (US); Darrell D. Jones, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/454,281

(22) Filed: Nov. 10, 2021

(65) Prior Publication Data

US 2022/0153440 A1 May 19, 2022

Related U.S. Application Data

(60) Provisional application No. 63/115,060, filed on Nov. 18, 2020.

(51) Int. Cl.
*B64F 5/10* (2017.01)
*B64F 5/50* (2017.01)
(Continued)

(52) U.S. Cl.
CPC .............. *B64F 5/10* (2017.01); *B29C 65/087* (2013.01); *B64C 1/068* (2013.01); *B64F 5/50* (2017.01);
(Continued)

(58) Field of Classification Search
CPC ......... G01N 29/0654; B64F 5/10; B64F 5/50; B29C 65/087; B29C 70/541; B64C 1/068;
(Continued)

(56) References Cited

U.S. PATENT DOCUMENTS 4,054,477 A * 10/1977 Curran ..................... B32B 3/12
156/212
6,131,460 A 10/2000 Brunty et al.
(Continued)

FOREIGN PATENT DOCUMENTS

DE 712525 C 10/1941

OTHER PUBLICATIONS

Netherlands Patent Office Written Opinion and Search Report with English Translation, dated Jul. 21, 2021, regarding Application No. NL2027433; 11 pages.
(Continued)

*Primary Examiner* — Lee A Holly
(74) *Attorney, Agent, or Firm* — Yee & Associates, P.C.

(57) ABSTRACT

Systems and methods are provided for assembling a section of a fuselage of an aircraft. The method includes pulsing a half barrel section of the fuselage along a track in a process direction, utilizing an indexing feature associated with the half barrel section to determine a desired contour for a portion of the half barrel section, and enforcing the desired contour onto the half barrel section using components that enforce an inner mold line and components that enforce an outer mold line when the half barrel section is out of tolerance from the desired contour.

15 Claims, 15 Drawing Sheets

(51) Int. Cl.
*B64C 1/06* (2006.01)
*B29C 65/08* (2006.01)
*B29L 31/30* (2006.01)
*B64C 1/00* (2006.01)

(52) U.S. Cl.
CPC ............. *B29L 2031/3082* (2013.01); *B64C 2001/0072* (2013.01)

(58) Field of Classification Search
CPC ..... B64C 2001/0072; B29L 2031/3082; B32B 3/12; F02K 1/18
See application file for complete search history.

(56) References Cited

U.S. PATENT DOCUMENTS

| | | |
|---|---|---|
| 6,367,330 B1 | 4/2002 | Schafer |
| 2008/0307886 A1 | 12/2008 | Marsh et al. |
| 2010/0006202 A1 | 1/2010 | Schendel et al. |
| 2010/0313664 A1 | 12/2010 | Cain, Jr. |
| 2014/0346095 A1 | 11/2014 | Kujacznski et al. |
| 2015/0000305 A1* | 1/2015 | Jasklowski ............... F02K 1/18 60/722 |
| 2015/0329221 A1* | 11/2015 | Georgeson ......... G01N 29/0654 702/36 |
| 2017/0284973 A1 | 10/2017 | Falter et al. |
| 2019/0084663 A1 | 3/2019 | Payne |
| 2019/0173574 A1 | 6/2019 | Georgeson et al. |
| 2019/0317482 A1 | 10/2019 | Stone et al. |
| 2020/0034495 A1 | 1/2020 | Riding et al. |
| 2020/0236987 A1 | 7/2020 | Casagrande et al. |
| 2020/0034678 A1* | 11/2020 | Ahn ...................... B29C 70/541 |

OTHER PUBLICATIONS

Extended European Search Report dated Mar. 11, 2022 regarding EP Application No. 21207617.8; 12 pages.

* cited by examiner

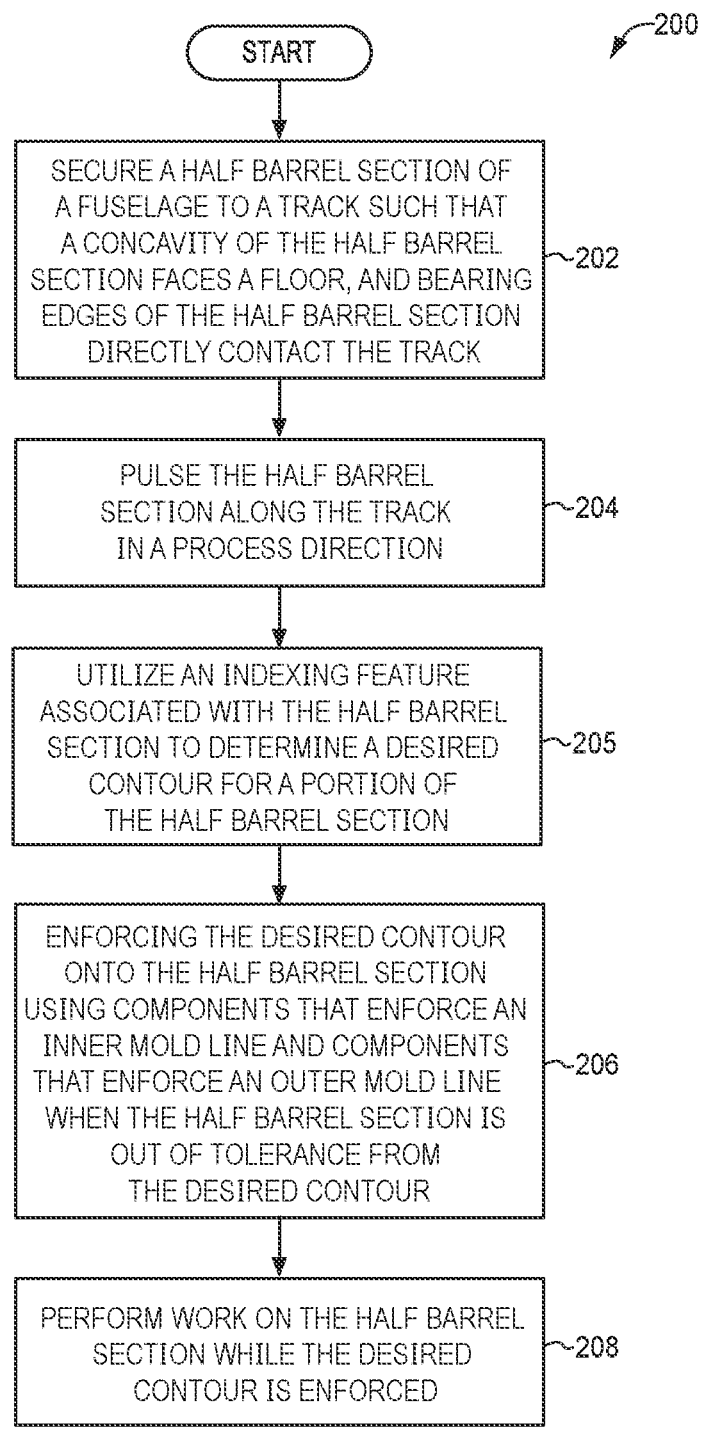

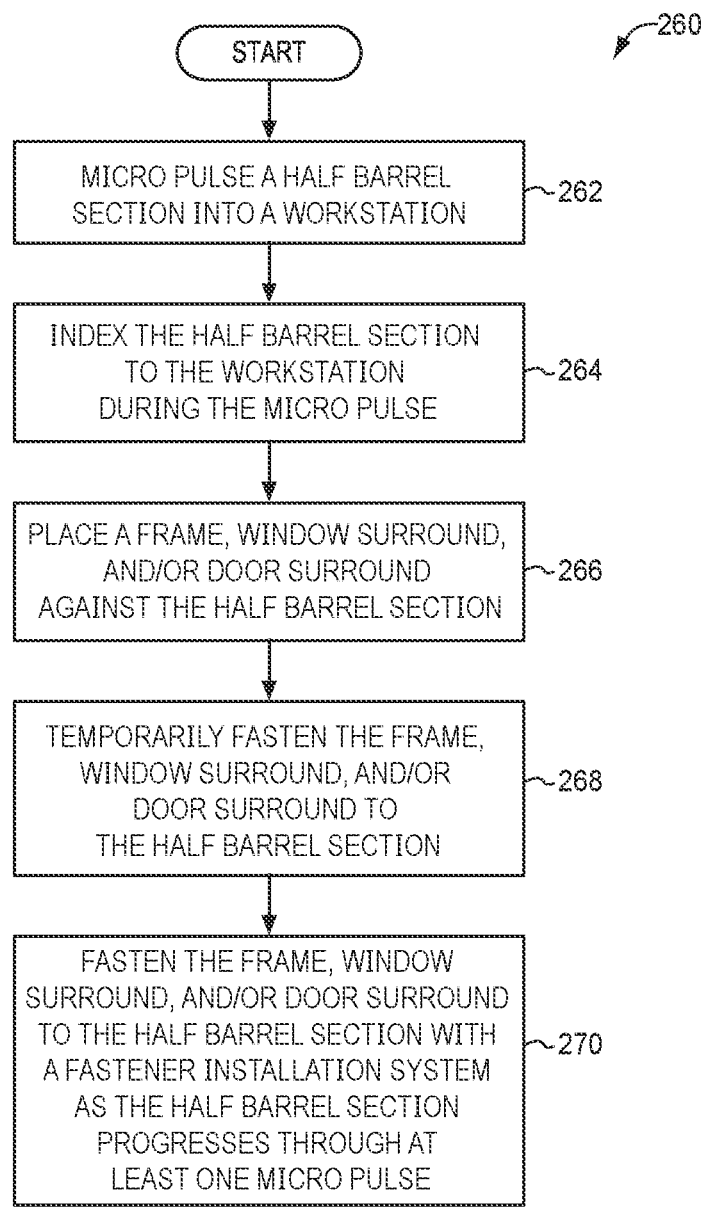

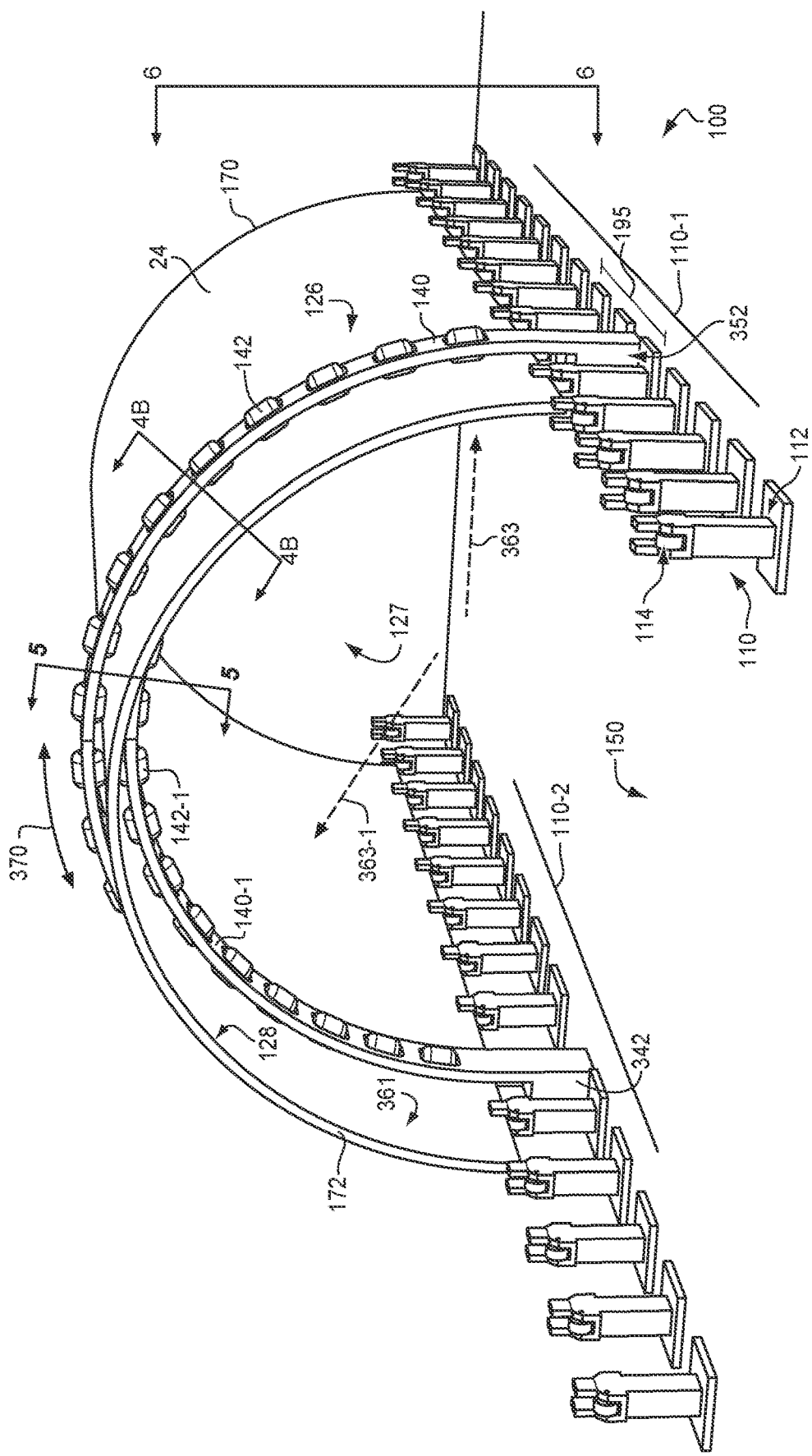

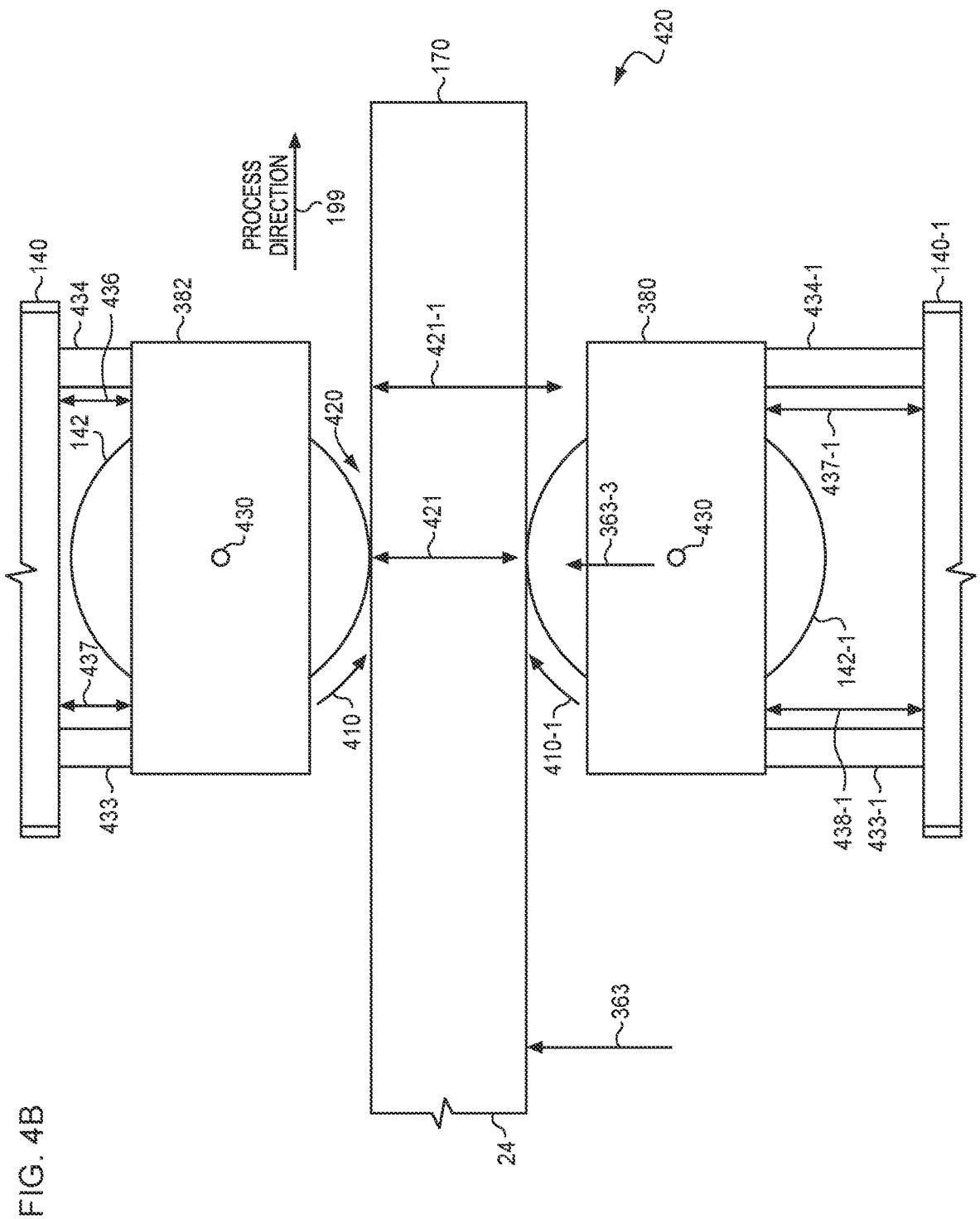

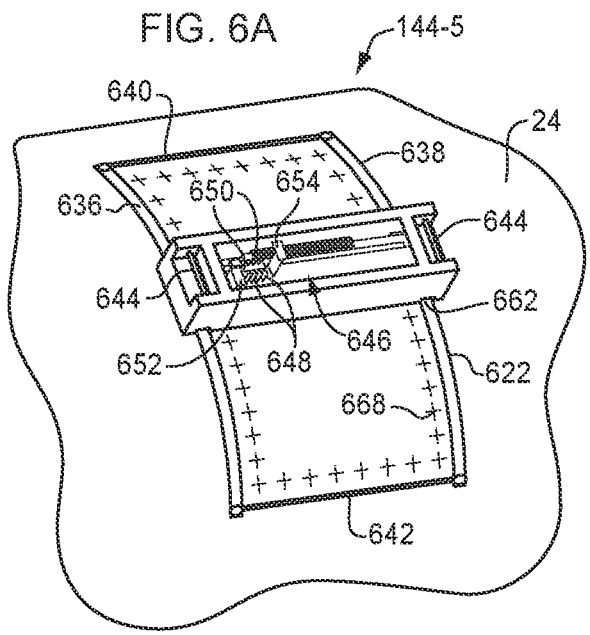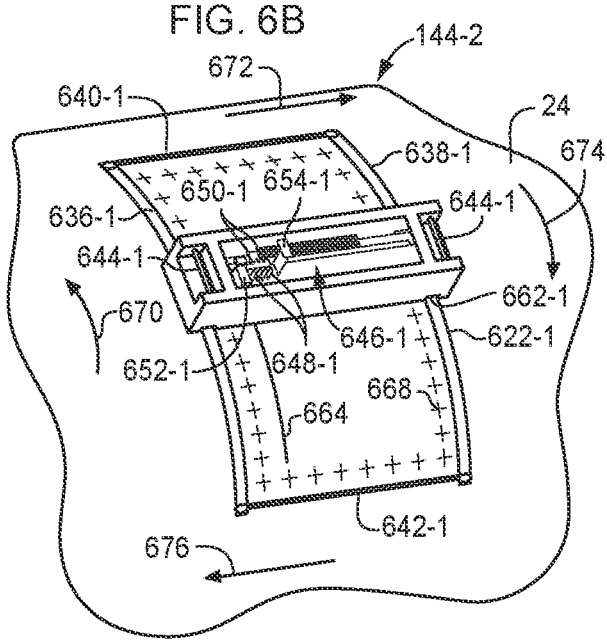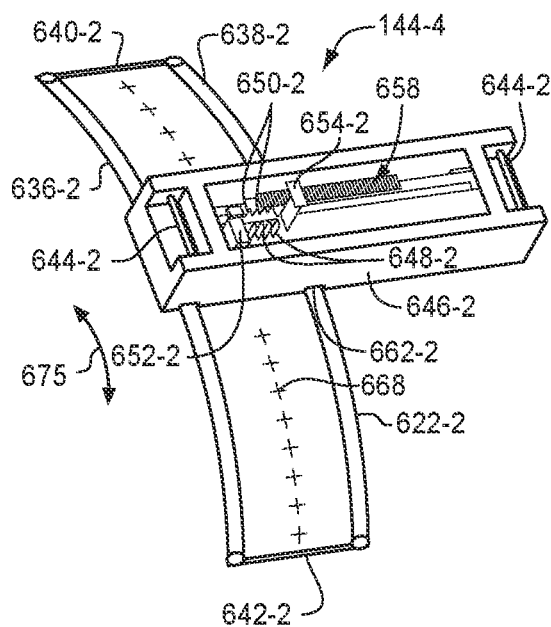

CONTOUR ENFORCEMENT FOR LINE ASSEMBLED FUSELAGE SEGMENTS

CROSS-REFERENCE TO RELATED APPLICATION

This application claims the benefit of U.S. Provisional Patent Application Ser. No. 63/115,060 filed Nov. 18, 2020, and entitled "Contour Enforcement for Line Assembled Fuselage Segments" which is incorporated herein by reference in its entirety.

FIELD

The disclosure relates to the field of fabrication, and in particular, to fabrication of fuselage sections for aircraft.

BACKGROUND

An airframe defines the mechanical structure of an aircraft. Airframes are made of multiple components that provide desired structural properties. For example, a portion of an airframe for a fuselage of an aircraft may include frames, skin, and stringers that are mechanically coupled together (e.g., via co-bonding, co-curing, or fasteners) in accordance with design parameters. As presently practiced, components of an airframe are fabricated and assembled in predefined cells on a factory floor. For example, a skin of an aircraft may be assembled at one cell, and then may be transported to a new cell where frames are installed into the skin to form a full barrel section before transporting to a next cell.

While the fabrication processes discussed above are reliable, they encounter delays when work at a specific portion of a component is completed more slowly than expected. For example, if a particular portion of a fuselage section takes longer than expected for installation of frames, then the entire section remains at the cell until all of the work that has been delayed is completed. The entire production system is delayed until the full barrel section is advanced to the next cell. During these operations, heavy tooling is utilized to maintain a desired loft/contour of the component at the cell.

Therefore, it would be desirable to have a method and apparatus that take into account at least some of the issues discussed above, as well as other possible issues.

SUMMARY

Embodiments described herein provide assembly line techniques and systems that facilitate contour enforcement for half barrel sections of fuselage during fabrication. Specifically, stationary arches at the assembly line contact and enforce a desired cross-sectional contour onto the half barrel sections, which facilitates the performance of work at the half barrel sections.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

BRIEF DESCRIPTION OF THE DRAWINGS

Some embodiments of the present disclosure are now described, by way of example only, and with reference to the accompanying drawings. The same reference number represents the same element or the same type of element on all drawings.

FIG. 2 is a flowchart illustrating a method of operating a fuselage assembly system to enforce inner and outer mold lines.

FIG. 2C is a flowchart illustrating a method for performing work on a half barrel section at a stationary workstation.

FIG. 3 is a perspective view of a half barrel section traveling through a fuselage assembly system in an illustrative embodiment.

FIGS. 4, 4A-4C and 5 are section cut views of a wheeled arch that enforces a desired contour in an illustrative embodiment.

FIGS. 6A-6C depict a flex track type fastener installation apparatus in an illustrative embodiment.

DETAILED DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The fuselage segments discussed herein may be fabricated as metal (e.g., aluminum) or composite parts. Composite parts, such as Carbon Fiber Reinforced Polymer (CFRP) parts, are initially laid-up in multiple layers that together are referred to as a preform. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform to a final hardened shape (i.e., transitioning a preform into a composite part) is referred to as "hardening," and this term encompasses both the curing of thermoset preforms and the forming/solidifying of thermoplastic preforms into a final desired shape.

Figure 1:
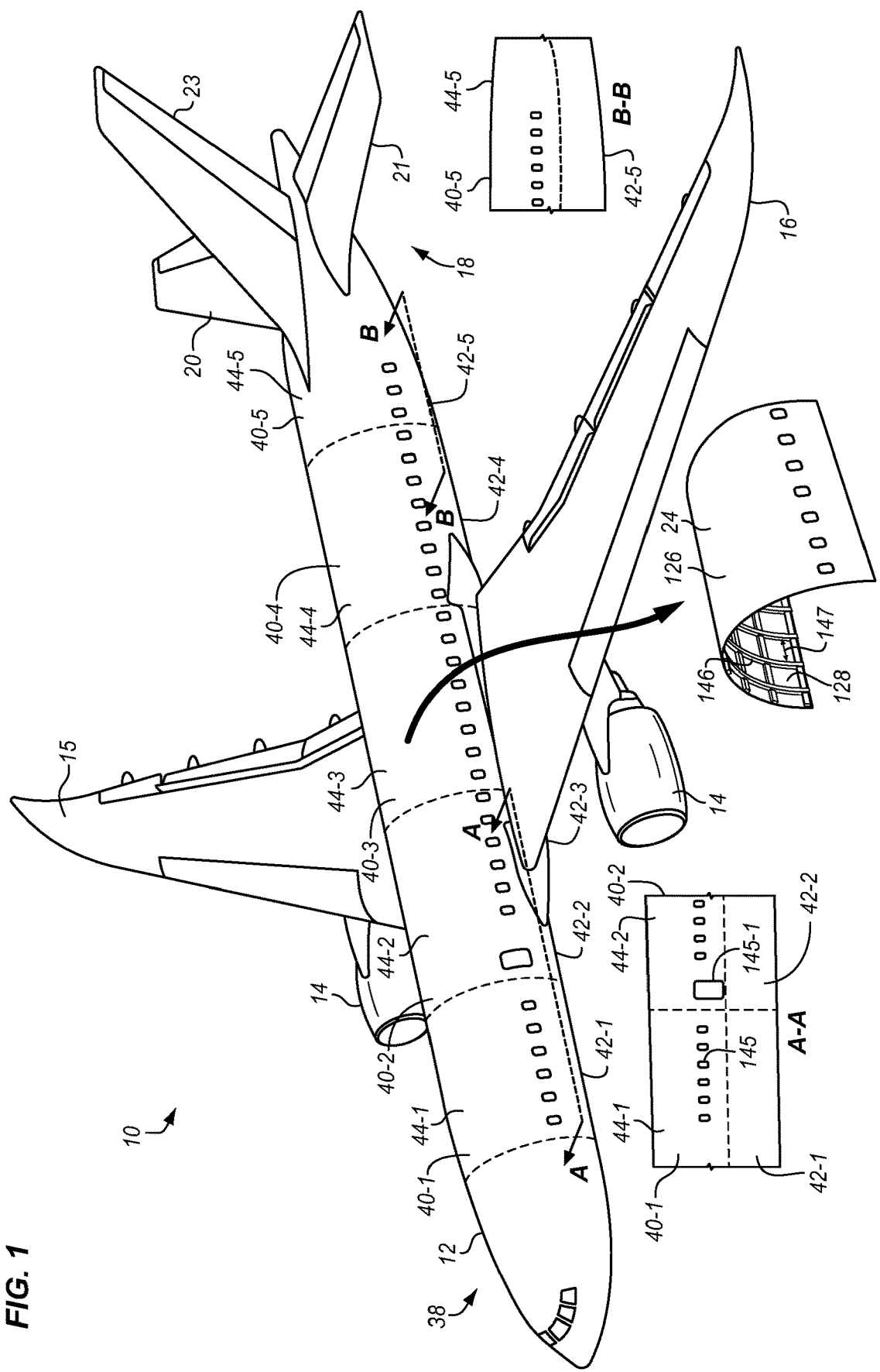
FIG. 1 illustrates an aircraft fabricated from half barrel sections.

Turning now to FIG. 1, an illustration of an aircraft 10 is depicted in which an illustrative embodiment may be implemented. In this illustrative example, aircraft 10 has a right wing 15 and left wing 16 attached to fuselage 12. One each of engines 14 attached to right wing 15 and left wing 16. Embodiments of aircraft are known with additional engines 14 and different engine placements. Fuselage 12 includes a tail section 18 and a nose section 38. Horizontal stabilizer 20, horizontal stabilizer 21, and vertical stabilizer 23 are attached to tail section 18 of fuselage 12. Aircraft 10 is an example of an aircraft where the majority of the fuselage 12 is formed from multiple half barrel sections 24, the fabrication is which is partially illustrated in FIG. 1A. The multiple half barrel sections 24, when attached together, form the majority of fuselage 12.

As mentioned, fuselage 12 is fabricated from multiple half barrel sections 24. Half barrel sections 24 are configured to be either an upper half barrel section 40 or a lower half barrel section 42 which are ultimately joined together to form a full barrel section 44. FIG. 1 depicts several full barrel sections 44 including: 44-1, 44-2, 44-3, 44-4, and 44-5. For completeness, full barrel section 44-1 is fabricated using upper half barrel section 40-1 and lower half barrel section 42-1, full barrel section 44-2 is fabricated using upper half barrel section 40-2 and lower half barrel section 42-2, full barrel section 44-3 is fabricated using upper half barrel section 40-3 and lower half barrel section 42-3, full barrel section 44-4 is fabricated using upper half barrel section 40-4 and lower half barrel section 42-4, and full barrel section 44-5 is fabricated using upper half barrel section 40-5 and lower half barrel section 42-5. The full barrel section 44-1, 44-2 corresponds to view A-A and full barrel section 44-5 corresponds to view B-B and are serially fastened into fuselage 12. Lower half barrel section 42-3 is sometimes referred to as a wing box as the wings, right wing 15 and left wing 16, attach to this section.

All of the above described half barrel sections (e.g., upper half barrel section 40 and lower half barrel section 42), unless specifically otherwise described, will be referred to as half barrel section 24. In some embodiments, the half barrel section 24 comprises a hardened composite skin part or a metal skin part, such as those awaiting installation of window surrounds 145 and door surrounds 145-1 (view A-A) and frames 146 (FIG. 1) to enhance rigidity. An embodiment has one half barrel section 24 as a composite skin part of one aircraft model and another half barrel section 24 as a metal skin part progressing serially down the assembly system 100.

Figure 1A:
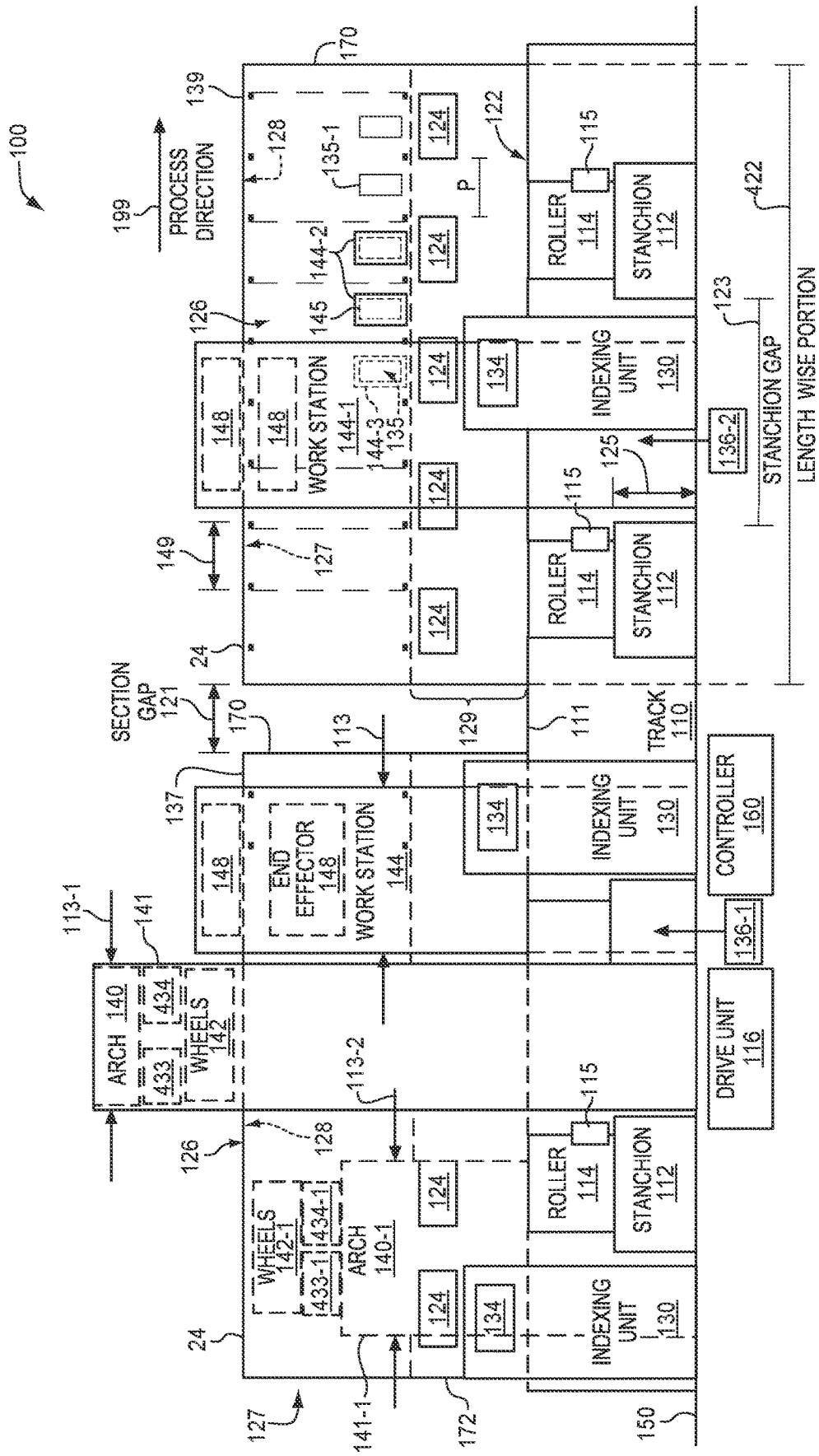
FIG. 1A illustrates a fuselage assembly system in an illustrative embodiment.

FIG. 1A illustrates a side view block diagram of a fuselage assembly system 100 of a factory in an illustrative embodiment. Fuselage assembly system 100 comprises any system, device, or component operable to iteratively pulse one or more of half barrel sections 24 of fuselage 12 a distance less than their length along a track 110. Fuselage assembly system 100 is further capable of performing work along an Inner Mold Line (EVIL) 128 and/or an Outer Mold Line (OML) 126 on the half barrel sections 24 while the half barrel sections 24 are paused between pulses. However, embodiments will also be described where work is performed while the half barrel section is in motion within fuselage assembly system 100. Inner Mold Line (EVIL) 128 and Outer Mold Line (OML) 126 are also illustrated on the half barrel section 24 of FIG. 1.

There is a section gap 121 between the two half barrel sections 24. The section gap 121 can be dimensioned to provide for pauses in operation of a workstation, such as workstation 144 or workstation 144-1, during which worker breaks, station maintenance, and inspections can be performed. The section gap 121 provides these worker breaks and station maintenance benefits when section gap 121 is opposite the workstation, such as workstation 144 or workstation 144-1. The section gap 121 is typically set at a multiple of the micro pulse 149 and/or frame pitch 147 (shown in FIG. 1) of the half barrel sections 24. The micro pulse 149 length is less than the length of the half barrel section 24 and could be as short as the frame pitch 147 or a fraction or multiple thereof. Therefore, the section gap 121 is, in one embodiment, is a multiple of frame pitch 147 and as illustrated, section gap 121 is equal to frame pitch 147. Frame pitch 147 is generally the same as the distance between each window surround 145. In one embodiment, the section gap 121 is between two and twenty feet. Each of the half barrel sections 24 defines a concavity 127 which encompasses one or more workstations 144, 144-1. Additional workstations, which provide different or the same functionalities as workstations 144, 144-1 may also be placed within and/or external to the concavity 127. End effectors 148 associated with the workstations 144, 144-1 perform work on the half barrel section 24. This work may comprise trimming, cutting, drilling, fastening, placing components (e.g., frames 146), performing Non-Destructive Inspection (NDI) of the half barrel section 24, etc.

In this embodiment, each of the half barrel sections 24 is moved via its bearing edge 122 in a process direction 199 (labeled "process direction 199" in FIG. 1A) along track 110. The track 110 comprises one or more rails 111, rollers 114, or other elements that facilitate motion (e.g., rolling or sliding) of the half barrel section 24 along the track 110. Half barrel sections 24 are pulsed synchronously along track 110 in a process direction 199, while a shape of the half barrel sections 24 is enforced (as further described herein) such that concavities 127 face a floor 150 of the factory. A half barrel section 24 configured as an upper half barrel section 40 is moved in a process direction 199 in a crown up position 139. A half barrel section 24 configured as a lower half barrel section 42 is moved in a process direction 199 in a keel up position 137. In further embodiments, the track 110 includes a drive unit 116 (e.g., a chain drive, motorized cart, powered rollers or other powered system) that is capable of moving the half barrel sections 24 in the process direction 199.

In this embodiment, the track 110 includes stanchions 112 (e.g., a discretized series of stanchions), onto which rollers 114 are disposed. Stanchions 112 are separated by a stanchion gap 123, which may be three feet or more, such as four to six feet. Stanchions 112 have a stanchion length 125 of more than four feet in one embodiment. Another embodiment has stanchions 112 of a have a stanchion length 125 of six or eight or more feet are also possible. The stanchion gap 123 and stanchion length 125 enables technicians to easily exit under the track 110 or ingress workstation 144 or workstation 144-1 under bearing edge 122 of half barrel section 24. In one embodiment the bearing edges 122 of the half barrel sections 24 directly contact the rollers 114 of the track 110. The rollers 114 physically support the bearing edge 122 of the half barrel sections 24, and enforce a desired Outer Mold Line (OML) 126 and/or Inner Mold Line (EVIL) 128 (e.g., within tolerance) onto the half barrel sections 24. The track 110 further comprises motors 115 that drive the half barrel sections 24 (e.g., by spinning the rollers, or by pulling the half barrel sections 24).

In further embodiments, the bearing edges 122 are mounted to rails 111 which ride upon the rollers 114. In still further embodiments, bearing edges 122 are mounted upon rollers 114. In an embodiment, the bearing edges 122 and rollers 114 glide along rail 111. Arches 140, 140-1 are stationary components affixed to floor 150. When referred to separately, arch 140 will be referred to as either the second arch 140 or the outer arch 140, and arch 140-1 will be referred to as the first arch 140-1 or the inner arch 140-1.

The arches 140, 140-1 are systems/components that enforce an OML 126 and/or an EVIL 128 onto half barrel sections 24 while enabling the half barrel sections 24 to proceed through (i.e., in between them). In this embodiment, one or more second arches 140 contact the OML 126 with wheels 142, while one or more inner arches 140-1 are disposed within concavity 127 contacting the IML 128 with wheels 142-1. Enforcing the OML 126 and IML 128 comprises pushing the half barrel section 24 through the space between arches 140 and 140-1. Each arch 140, 140-1 includes a rigid fixed body 141, 141-1. The respective arches 140, 140-1 includes wheels 142, 142-1 that are mounted circumferentially around the body 141, 141-1 and are rotatably affixed to the body 141, 141-1. The wheels 142, 142-1 contact the half barrel sections 24 in order to physically enforce OML 126 and IML 128 (which also results in a desired contour 361) onto the half barrel sections 24. Wheels 142, 142-1 also operate to push the half barrel section 24 along the arches 140, 140-1, respectively.

In further embodiments, work density, as exemplified by the number of workstations 144, 144-1 disposed along a half barrel section 24, is substantially higher than that shown in FIG. 1A. The number of workstations 144, 144-1 and their complexity have been reduced and simplified for the sake of clarity. That is, the amount of work performed on the half barrel section 24 per square foot of factory floor space is increased as the number of workstations 144, 144-1 per track 110 length is increased. The work density is also substantially higher than in prior assembly systems resulting in substantial increases in efficiency and reduced the size of fuselage assembly system 100. In still further embodiments, the arches 140, 140-1 are mobile and capable of traveling along parallel to the track 110. The arches 140, 140-1 are capable of self-propulsion or movement upon a track, which as shown in FIG. 3, includes two parallel track sections 110-1, 110-2.

Fuselage assembly system 100 further comprises indexing units 130. Each indexing unit 130 is designed to physically or communicatively couple with an indexing feature 124 such as an RFID chip, an added feature, such as a pin, or a machined feature, such as a hole or slot in the half barrel section 24. Another embodiment has a scanner as the indexing unit 130 scanning the indexing feature 124, particularly devices that can be scanned, like RFID chips. The indexing features 124 are placed at known, precise locations along the half barrel section 24, and in one embodiment each of the indexing features 124 is separated by the same distances along the half barrel section 24. In further embodiments, the indexing features 124 are placed at various spacings and conform to various shapes and sizes. In a further embodiment, the indexing features 124 are arranged linearly or are placed non-linearly, depending on the configuration of the individual indexing unit 130 utilized to sense a particular indexing feature 124. The linear or non-linear arrangement of indexing features 124 include varying or non-varying spacing there between. In still further embodiments, the indexing features 124 are disposed in a manufacturing excess 129 of the half barrel section 24, which is trimmed away at some point prior to completion of the half barrel section 24. In such embodiments, fuselage assembly system 100 is programmed to precisely stop a pulse or micropulse of the half barrel section 24 when the indexing feature 124 is within an operational field of view of a respective indexing unit 130.

In other embodiments, certain of the indexing units 130 include a complementary feature 134 for insertion into, grasping, or otherwise fitting with an indexing feature 124 that is mechanical in nature, facilitating a hard stop when indexing feature 124 and complementary feature 134 are mated. Indexing units 130 are placed at fixed, known locations relative to the track 110 or workstations 144, 144-1. During assembly, half barrel section 24 is pulsed a distance at least equal to the shortest micro pulse 149, such as a frame pitch 147. That is, the half barrel section 24 is pulsed to an indexing unit 130. Whenever the indexing features 124 in the half barrel section 24 and the complementary features 134 in the indexing units 130 are mated, the location of the half barrel section 24 is indexed to a known location in a coordinate space shared by the track 110, the indexing units 130, and/or workstations 144, 144-1 and the concavity 127. Specifically, each indexing unit 130 is disposed at a known offset (e.g., along three axes) from a workstation, such as workstation 144 or workstation 144-1. This means that the act of indexing a half barrel section 24 to the indexing units 130 causes the position of the half barrel section 24 OML 126 and/or IML 128 within the purview 113, 113-1, 113-2 of each of the workstations 144, 144-1 and/or arches 140, 140-1 to be known to the workstations 144, 144-1 or arches 140, 140-1 at the end of each micro pulse 149. Furthermore, the act of indexing a half barrel section 24 to the indexing units 130 causes the position of the half barrel section 24 OML 126 and/or EVIL 128 within the purview 113, 113-1, 113-2 of each of the arches 140, 140-1 to be known at the end of each micro pulse 149. Arches 140, 140-1 enforce a desired OML 126 and/or IML 128 for the half barrel sections 24 and bring about a desired contour 361 (shown in FIG. 3) at the arches 140, 140-1 and/or workstations 144, 144-1 while indexing occurs and may continue to do so before and/or after indexing.

Indexing conveys to the arches 140, 140-1 specifics on the half barrel section 24 within the purview 113-1, 113-2 of arches 140, 140-1, respectively. The information is used to set the position of the wheels 142, 142-1 relative to the arch 140, 140-1 using connectors 433, 434 and connectors 433-1, 434-1, respectively. The radius 363 (shown in FIG. 3) of the half barrel sections 24 may vary from one half barrel section 24 to the next. In an embodiment, half barrel section 24 is one model with a specific radius 363 and the next half barrel section 24 will require a different radius 363. Another embodiment includes the half barrel sections 24 that have a non-constant or tapered radius 363 as the half barrel section 24 micro pulses 149 in process direction 199. A non-constant or tapered half barrel section 24 will have a radius 363 and a second radius 363-1 which are not equal. The desired contour 361 of half barrel sections 24 is conveyed from the indexing feature 124 to the arch 140, 140-1 via complementary feature 134 and indexing unit 130. The wheels 142, 142-1 are adjusted relative to arches 140, 140-1 to suit radius 363 of the half barrel section 24, respectively. Variations from model to model include different size radius 363 of the half barrel section 24. The wheels 142, 142-1 are positioned relative to the arch 140, 140-1 such that desired contour 361 can be enforced upon half barrel section 24 within the purview 113-1, 113-2 of arches 140, 140-1, respectively, for a particular radius 363. The leading edge 170 of half barrel section 24 is engaged by wheels 142, 142-1 during micro pulse 149. The wheels 142, 142-1 enforce the desired contour 361 upon half barrel section 24 until the trailing edge 172 passes through the wheels 142, 142-1.

Purview 113-1, 113-2 is the width of the work performed by arches 140, 140-1 upon half barrel section 24 during a pause or during a pulse. Stated differently, purview 113-1, 113-2 is the length of the half barrel section 24 that is within the working reach of the arches 140, 140-1 during a pause or during a micro pulse 149. The arches 140, 140-1 are illustrated with a greater purview 113-1, 113-2 relative to the lengthwise portion 422 than in actual practice. The purview 113-1, 113-2 of the arches 140, 140-1 is typically closer in length to micro pulse 149 length. The purview 113-1, 113-2 of arches 140, 140-1 may or may not overlap.

As will be readily understood, only a small lengthwise portion of the half barrel section 24 is engaged by arches 140, 140-1, and wheels 142, 142-1 at any one time, described in the preceding paragraph as purview 113-1 and 113-2. The influence of the arches 140, 140-1 on the half barrel section 24 will be felt in the half barrel section 24 both upstream and downstream of the arches 140, 140-1. So, in certain implementations a piecewise portion 195, longer than purview 113-1 or purview 113-2, of the half barrel section 24 is held in the desired contour 361. The addition of the frames 146, window surrounds 145, and door surrounds 145-1 also operate to enforce the desired contour 361 downstream of the arches 140, 140-1. As an example, and for illustration only, the arches 140, 140-1 operate to enforce a desired contour 361 for the length of one or two frame pitches 147 on each side of the arches 140, 140-1.

In one embodiment, indexing is performed at least according to the following description. A structure in the form of a half barrel section 24 is carried on the bearing edge 122 upon a track 110 comprising a set of stanchions 112 (e.g., pogos) affixed to the floor 150. The half barrel section 24 was fabricated on a layup mandrel according to precise dimensions. This precise layup enables indexing features 124 to be precisely located in a manufacturing excess 129 of the half barrel section 24. Thus, once the half barrel section 24 is precisely located on the stanchions 112, the arches 140, 140-1 enforce the OML 126 and/or EVIL 128 of the half barrel section 24. The OML 126 and/or IML 128 is precisely known when the indexing feature 124 is engaged, without the need for a full scan via probes or optical technology at each workstation, such as workstation 144 and workstation 144-1, after each micro pulse 149.

The relative stiffness of the de-molded or otherwise formed half barrel section 24 is relied upon to help the half barrel section 24 maintain a configuration reasonably close to a desired OML 126 and/or IML 128 (e.g., desired contour 361) and without the need for any shape defining tooling to be mounted or affixed to the half barrel section 24 during the micro pulse 149. Shape defining tooling would require an additional workstation (e.g., similar to workstation 144) for its installation upon half barrel section 24 and another additional workstation for removal of the shape defining tooling. In the example, instances of the shape defining tooling would be mounted upon the ends of the half barrel section 24 and one or more additional instances would be mounted somewhere in between the ends. The shape defining tools would somewhat obscure access to the half barrel section 24 until it is removed. Further, the addition and removal of shape defining tooling can be looked upon as non-value added work with respect to the half barrel section 24.

In the embodiments disclosed herein, the indexing features 124 are located precisely into the half barrel section 24 relative to the OML 126 and/or IML 128 of the half barrel section 24 and the precisely located rails features of track 110 (e.g., rails 111 and rollers 114) and arches 140, 140-1 help convey the half barrel section 24 from workstation 144 to workstation 144-1 without distortion. Therefore, a 3D position and orientation, like OML 126 and/or IML 128 of the half barrel section 24 is known quickly and precisely when indexed after each micro pulse 149 without the need to re-scan and adjust the half barrel section 24 after each movement.

Continuing, the frames 146, window surrounds 145 and door surrounds 145-1 are installed into half barrel section 24 to stiffen it prior to removing window and/or door installation manufacturing excess 135 resulting in trimmed edge 135-1. In the illustrated example, workstation 144 installs frames 146 into half barrel section 24. Workstation 144-1 fastens window surrounds 145 into half barrel section 24. The traveling workstation 144-2 is attached at placement point 144-3 and rides along with half barrel section 24 while performing work during micro pulses 149 and/or pauses between micro pulses 149. The traveling workstation 144-2 rides along and separates manufacturing excess 135 from half barrel section 24 after window surrounds 145, door surrounds 145-1, and frames 146 are installed.

Figure 6:
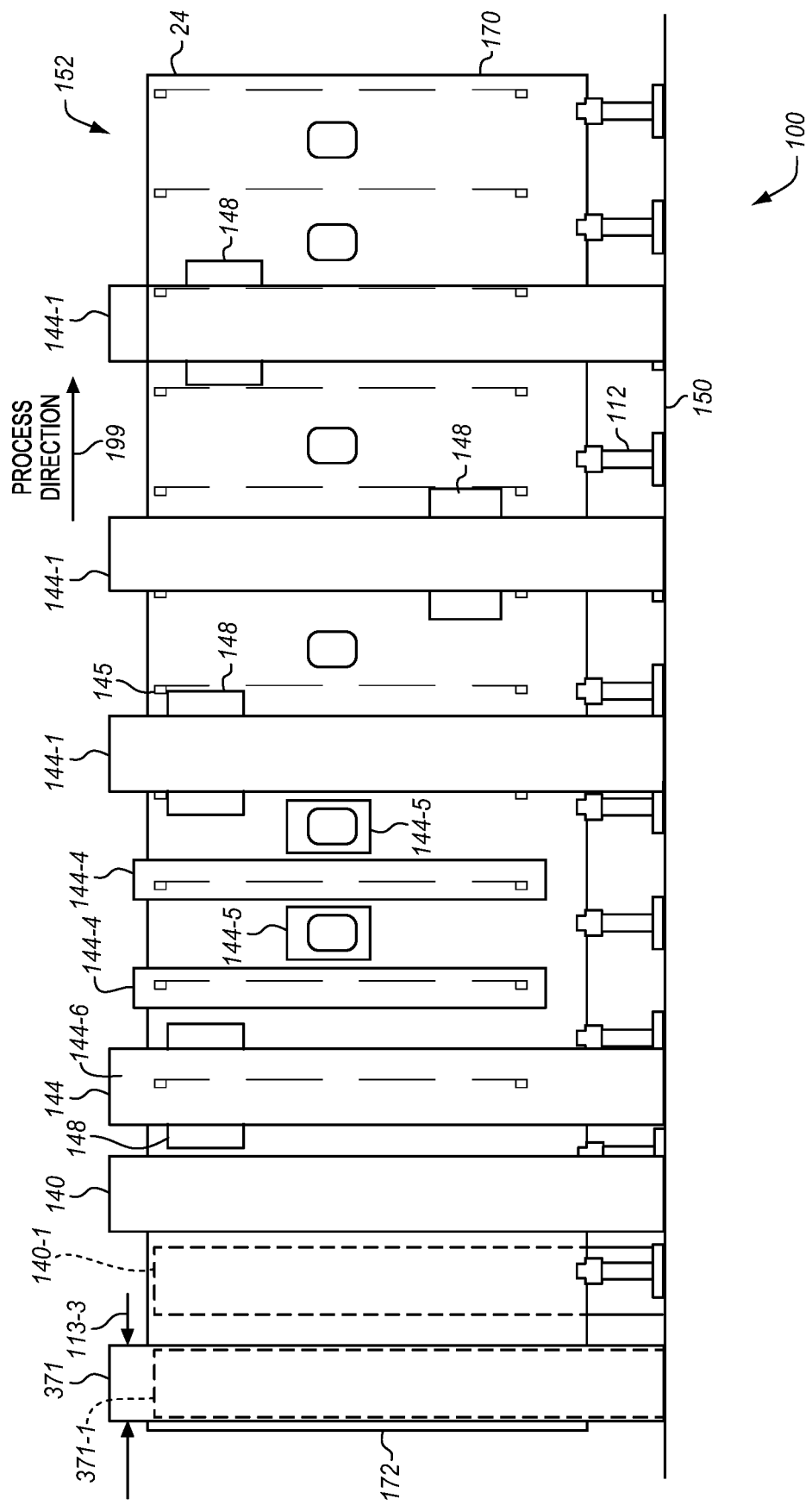
FIG. 6 is a side view of stationary arches that enforce a desired contour, and downstream workstations in an illustrative embodiment.

Other embodiments of workstations 144 are illustrated in FIG. 6. Specifically, traveling workstation 144-4 and traveling workstation 144-5 include flex track type fastener installation apparatus shown in FIGS. 6A and 6C. The traveling workstation 144-2 travels along with the half barrel section 24 like a "hitch hiker" and then returns to a placement point 144-3 for reattachment and further work on half barrel section 24. An embodiment may have multiple traveling workstations 144-2 travelling along with half barrel section 24 at any one time. Furthermore, prior to having the windows or doors manufacturing excess 135 removed, the frames 146 and window surround 145 and door surrounds 145-1 are added to stiffen the half barrel section 24 and then windows and/or doors manufacturing excess 135 is removed. While only workstations 144, 144-1 are shown, many more workstations are possible.

Because of the precise indexing performed, the technicians at each workstation, such as workstation 144 and workstation 144-1, are able to know exactly where they are or tooling, like end effectors 148, are located relative to the half barrel section 24. The half barrel section 24 is mechanically or otherwise held in place during indexing. The OML 126 or IML 128 of the half barrel section 24 is then established or indexed into any Numerical Control (NC) programming or automated system in use at the respective workstation, such as workstation 144 and workstation 144-1. Therefore, no setup time or scanning is needed after each pulse of the half barrel section 24. Furthermore, structure added to (e.g., frames 146, window surrounds 145, door surrounds 145-1) or removed (manufacturing excess 135) from the half barrel section 24 in the prior workstations 144, 144-1 may be added to whatever half barrel section 24 model or representation is within the fuselage assembly system 100, without the need to scan the half barrel section 24 for the changes.

That is, the indexing of a half barrel section 24 may be performed by aligning the half barrel section 24 to the indexing unit 130. The workstations 144, 144-1 have a known relationship with the indexing unit 130, so this also indexes the half barrel section 24 to the workstations 144, 144-1. When the two are in a known relationship, tools, such as end effector 148, at the workstations 144, 144-1 are in a known relationship to the OML 126 and IML 128 of the half barrel section 24. Thus, indexing a half barrel section 24 may include mating the indexing feature 124 at a half barrel section 24 with a complementary feature 134 at an indexing unit 130 having a known physical offset from the workstations 144, 144-1. This is because the complementary features 134 at the indexing unit 130 are pre-located and sized to fit with the indexing features 124 while the half barrel section 24 is at a specific and precisely determined location.

In an embodiment, mating the complementary features 134 at the indexing unit 130 with the indexing features 124 conveys the type of half barrel section 24 and the extent of the work to be performed upon half barrel section 24 within the purview 113 of a workstation, such as workstation 144 or workstation 144-1. Purview 113 is the width of the work performed by a workstation of workstation 144 and workstation 144-1 upon half barrel section 24. The purview 113 runs in the lengthwise portion 422 of the half barrel section 24. The type of half barrel section 24 conveys to workstations 144, 144-1 what feeder lines 136-1, 136-2 need to provide just-in-time (JIT) to workstations 144, 144-1, respectively. The feeder line 136-1 provides frames 146, fasteners, sealant and etc. to workstation 144 JIT. The feeder line 136-2 provides window surrounds 145, fasteners, sealant and etc. to workstation 144-1 JIT.

In another embodiment, mating the complementary features 134 at the indexing unit 130 with the indexing features 124 conveys OML 126 and EVIL 128 data to arches 140, 140-1. This information is used to help the arches 140, 140-1 enforce the desired OML 126 and/or EVIL 128 upon half barrel section 24 using wheels 142. Arches 140, 140-1 can be an adjunct upon workstations 144, 144-1 in addition to being a standalone. Generally speaking, arches 140, 140-1 are no longer needed after installation of frames 146, window surrounds 145 and door surrounds 145-1 as these also operate to enforce the OML 126 and IML 128 on the half barrel sections 24.

Figure 4:
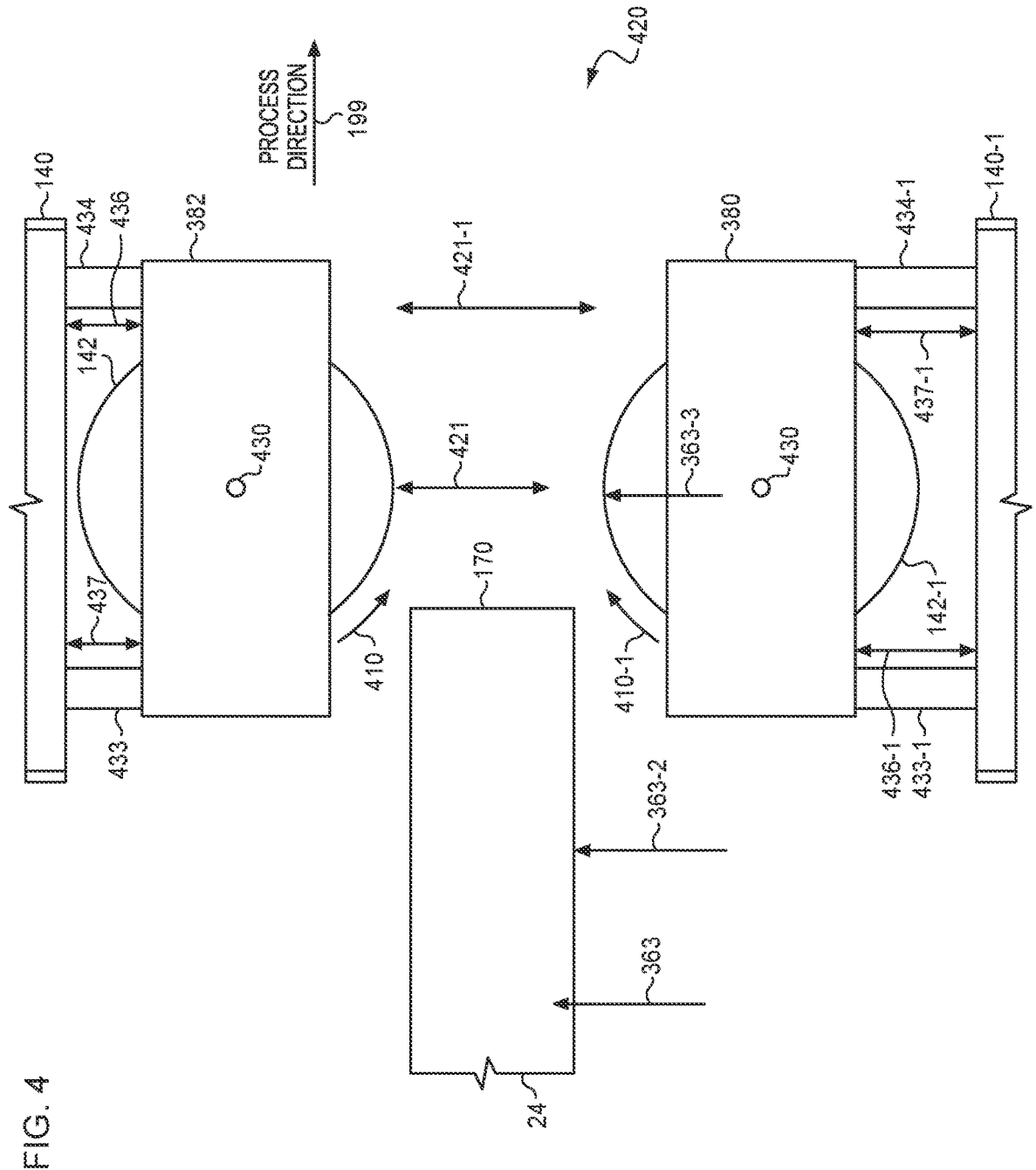

The operations of the track 110, workstations 144, 144-1, arches 140, 140-1 and/or other components are managed by controller 160. In one embodiment, controller 160 determines a progress of the half barrel section 24 along the track 110 (e.g., based on input from a technician or through the automated sensing of indexing features 124), in accordance with an automated process such as input from a camera or physical sensor, such as a linear or rotary actuator. Based upon index conveyed information to arches 140, 140-1, the controller 160 instructs the connectors 433, 433-1, 434, 434-1 to reach length 436, 436-1 (shown in FIG. 4). Referring to FIG. 4 the controller 160 positions the wheels 142, 142-1 to form a nip 420 at the desired radius 363. Preliminarily, nip 420 is set at gap 421-1 to facilitate leading edge 170 initially passing between wheels 142, 142-1. Then controller 160 instructs the connectors 433, 433-1, 434, 434-1 to form nip 420 at gap 421. The controller 160 uses this input to manage the operations of the various components in accordance with instructions stored in a Numerical Control (NC) program. Controller 160 may be implemented, for example, as custom circuitry, as a hardware processor executing programmed instructions, or some combination thereof.

This process, using the arches 140, 140-1, is used to enforce a desired contour 361 onto the half barrel section 24 within the purview 113 of an adjacent workstation, workstation 144 or workstation 144-1, during the micro pulse 149 or pause between micro pulses 149. This permits a forcing of half barrel section 24 into desired contour 361 transiently within the workstation, workstation 144 or workstation 144-1, when the half barrel section 24 is out of tolerance.

Illustrative details of the operation of fuselage assembly system 100 will be discussed with regard to FIG. 2. Assume, for this embodiment, that half barrel section 24 of fuselage (e.g., half barrel sections, one-third barrel sections, or any suitable circumferential fraction) have had bearing edges 122 trimmed into them on a layup mandrel prior to demolding. The sections have been demolded and await assembly work such as trimming, frame installation, inspection, or other activities.

FIG. 2 is a flowchart illustrating a method of operating a fuselage assembly system 100 in an illustrative embodiment. The steps of method 200 are described with reference to fuselage assembly system 100 of FIG. 1A, but those skilled in the art will appreciate that method 200 may be performed in other systems. The steps of the flowcharts described herein are not all inclusive and may include other steps not shown. The steps described herein may also be performed in an alternative order.

In step 202, a half barrel section 24 of fuselage is secured to the track 110 such that concavity 127 of the half barrel section 24 faces the floor 150, and bearing edges 122 of the half barrel section 24 directly contact the track 110. For upper half barrel sections 40, the half barrel sections 24 are moved in a process direction 199 in a crown up position 139. For lower half barrel sections 42, the half barrel sections 24 are moved in a process direction 199 in a keel up position 137. Phrased another way, the half barrel sections 24 form half-cylinder or an upside-down "U" shape with the keel at the apex of the "U" shape. At each apex end of the upside-down "U" and concavity 127 up, a bearing edge 122 is held/supported by rollers 114 of the track 110, and directly contacts these rollers 114. In one embodiment, securing the half barrel section 24 to the track 110 comprises placing the half barrel section 24 onto the track 110 such that the bearing edges 122 are held in place by the rollers 114. In some illustrative examples, multiple half barrel sections 24 of fuselage are secured to the track 110 such that concavities 127 of the half barrel sections 24 face the floor 150, and bearing edges 122 of the half barrel sections 24 directly contact the track 110.

In step 204, the half barrel section 24 is pulsed along the track 110 in a process direction 199. In one embodiment, pulsing the half barrel section 24 comprises micro pulsing the half barrel section 24 along the track 110 in a process direction 199. In one embodiment, pulsing the half barrel section 24 comprises micro pulsing the half barrel section 24 by a distance less than the length of a half barrel section 24. In a further embodiment, the half barrel section 24 is micro pulsed by a frame pitch 147 (i.e., a distance between frames 146 that will be placed into a half barrel section 24), although any suitable pulse distance may be utilized including multiples or fractions of frame pitch 147. During pulses, the half barrel section 24 may roll across wheels 142, 142-1 mounted to the arches 140, 140-1, and these wheels 142, 142-1 may contact the half barrel section 24 during and/or after movement of the half barrel section 24 to enforce the desired contour 361. In some illustrative examples, multiple half barrel sections 24 are pulsed (e.g., synchronously) along the track 110 in a process direction 199.

However, pulses less than a length of a half barrel section 24 are also referred to as "micro pulses." As used herein, a micro pulse may be any suitable distance including multiples of frame pitch 147. In one embodiment, a gap of at least two feet is left between the half barrel sections 24 during the pulsing. This enables technicians to exit between the half barrel sections 24 when the section gap 121 coincides with the workstations 144, 144-1. In further embodiments, the stanchions 112 are tall enough for the technicians to walk or duck underneath the track 110.

In step 205, an indexing feature 124 associated with the half barrel section 24 is utilized to determine a desired contour 361 for a portion of the half barrel section 24. In step 206, the desired contour 361 is enforced onto the half barrel section 24 using components that enforce an inner mold line 128 and components that enforce an outer mold line 126 when the half barrel section 24 is out of tolerance from the desired contour 361. In some illustrative examples, the components take the form of arches 140, 140-1, which define a cross-sectional OML 126 and EVIL 128. In some illustrative examples, enforcing an inner mold line 128 and an outer mold line 126 on a piecewise portion 195 of the half barrel section 24 via arches 140, 140-1 disposed along the track 110 to define a desired contour 361 for the half barrel section 24 is performed in step 206. In some illustrative examples, in step 206, arches 140, 140-1, which define a cross-sectional OML 126 and EVIL 128 enforce the cross-sectional OML 126 and EVIL 128 onto the half barrel sections 24. Enforcing includes pushing the half barrel section 24 into desired contour 361. In this embodiment, because wheels 142, 142-1 are in a known position with respect to the bodies 141 of the arches 140, 140-1, and because wheels 142, 142-1 contact the half barrel sections 24, the wheels 142, 142-1 hold the half barrel sections 24 in position and physically enforce conformance with a desired OML 126 and IML 128. In further embodiments, wheels 142, 142-1 only contact the half barrel sections 24 if the half barrel sections 24 are out of desired contour 361, and are used to enforce OML 126 and IML 128 onto the half barrel sections 24. In still further embodiments, the wheels 142, 142-1 maintain contact with the half barrel sections 24 between micro pulses, or are retracted from the half barrel sections 24 via connectors 433, 433-1, 434, and 434-1. The connectors 433, 434 and 433-1, 434-1 extendably attach the wheels 142-1, 142 to arch 140 and arch 140-1, respectively.

In step 208, work is performed on the half barrel section 24 while the desired contour 361 is enforced. In some illustrative examples, work is performed on the half barrel section 24 while the OML 126 and IML 128 are enforced. In some illustrative examples, work is performed on the piecewise portion 195 of the half barrel section 24 while the inner mold line 128 and outer mold line 126 are enforced. In embodiments where the half barrel sections 24 are pulsed, the work is performed during pauses between micro pulses 149, while wheels 142, 142-1 of the arches 140, 140-1 are forced into contact with the half barrel sections 24. In embodiments where the half barrel sections 24 are continuously moved, the work is performed as the half barrel sections 24 proceed in the process direction 199. The work is performed by workstations 144, 144-1 via end effectors 148, and may comprise cutting, drilling, trimming (e.g., final edge trimming). Another embodiment has tooling devices (e.g., those associated with traveling workstation 144-2, for example) attached to the half barrel section 24 to perform work upon the half barrel section 24 as it continues in the process direction 199. The tooling device, not shown, separates from the half barrel section 24 when work is completed and the tool returns to placement point 144-3 in the continuously moved line as described above. Such tooling might include, for example, Non-Destructive Inspection (NDI) devices, placing, fastening, etc. as discussed above. In embodiments where the half barrel sections 24 are micro pulsed 149, after the pause is completed, work proceeds to step 204 and the half barrel sections 24 are micro pulsed 149 again to receive additional work.

Method 200 provides a technical benefit by directly enforcing a desired contour 361 onto large moving parts, such as half barrel sections 24, without requiring the attachment of a jig or other component to those parts. Attaching a jig to enforce OML 126 and IML 128 is a non-value added task which adds effort and time to the manufacturing process. The arches 140, 140-1 and wheels 142, 142-1 provide flexibility to the fabrication process as OML 126 and IML 128 are enforced without restricting access to the portion of the half barrel section 24 within the purview 133 of a workstation, such as workstation 144 or workstation 144-1. Therefore, there is no ride along contouring tooling to further restrict access to the half barrel section 24 as it progresses through workstations 144, 144-1. This enables work to be performed precisely and without access encumbrances as the half barrel section 24 micro pulses 149 through workstations 144, 144-1. Furthermore, because multiple workstations 144, 144-1 can be disposed within a concavity 127 of a half barrel section 24, a large number of types of work (e.g., drilling, trimming, sealing, painting, inspection, etc.) can be performed simultaneously across various portions of the half barrel section 24 within the purview of workstations 144, 144-1. This increases assembly speed as well as work density on the factory floor 150. Still further, method 200 enables transport time for a half barrel section 24 to be transformed into value-added time wherein work is performed on the half barrel section 24, particularly during NDI inspection or trimming to remove manufacturing excess 129, 135 and/or bearing edge 122.

Purview 113 is the width of the work performed by a workstation, workstation 144 or workstation 144-1, upon half barrel section 24 during a pause or during a pulse. Stated differently, purview 113 is the length of the half barrel section 24 that is within the working reach of the workstation, workstation 144 or workstation 144-1, during a pause or during a pulse. The workstations 144, 144-1 are illustrated with a greater purview 113 relative to the lengthwise portion 422 than in actual practice. The purview 113 of the workstations 144, 144-1 is typically closer in length to micro pulse 149 length. The purview 113 of workstations 144, 144-1 do not overlap.

Figure 2A:
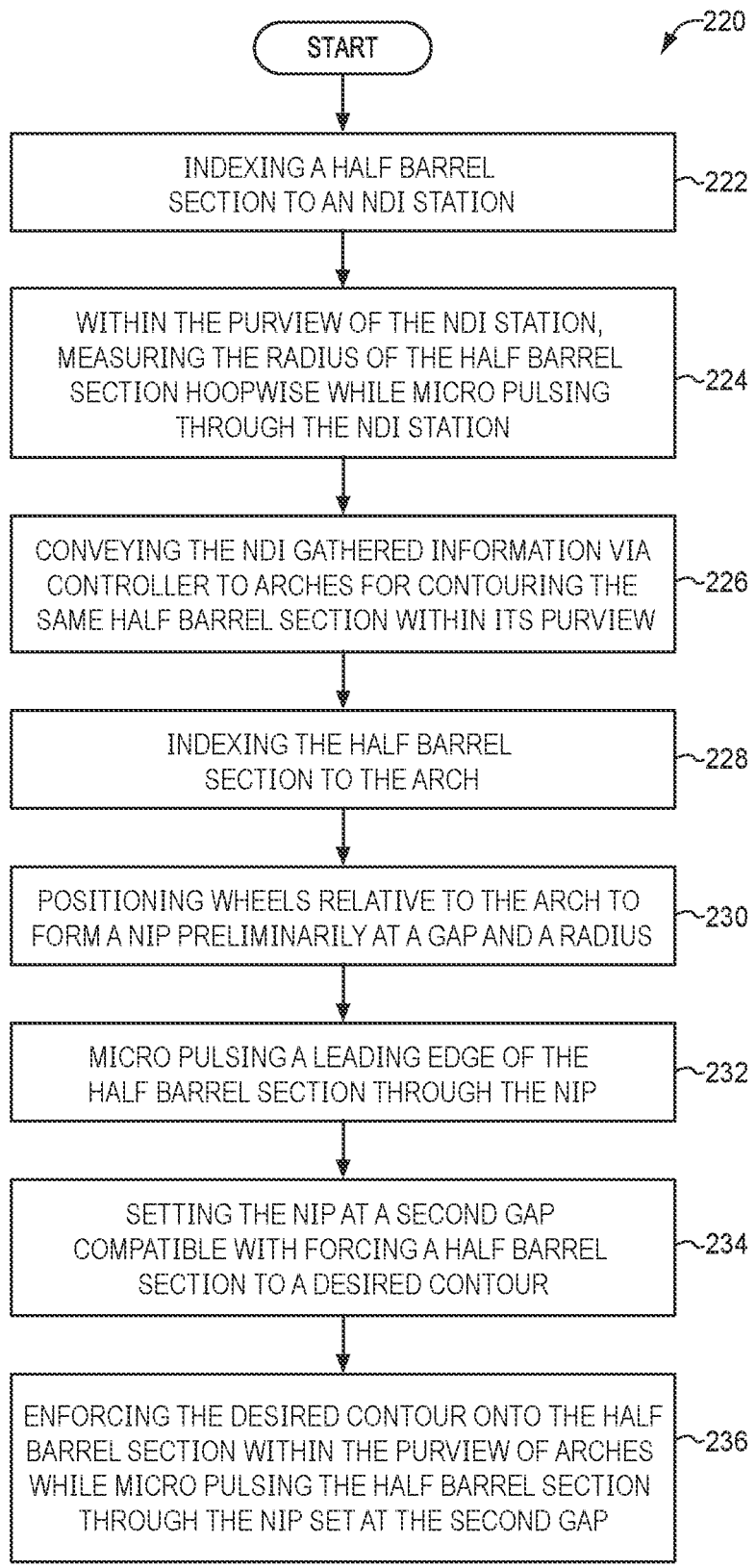
FIG. 2A is a flowchart illustrating a method of operating a fuselage assembly system for non-destructive inspection of a half barrel section and placing a leading edge of the half barrel section into a micro-pulsing system.

FIG. 2A is a flowchart illustrating a method of operating a fuselage assembly system 100 in an illustrative embodiment. The steps of method 220 are described with reference to fuselage assembly system 100 of FIG. 1A and FIG. 3 through FIG. 5, but those skilled in the art will appreciate that method 220 may be performed in other systems. The steps of the flowcharts described herein are not all inclusive and may include other steps not shown. The steps described herein may also be performed in an alternative order.

The half barrel sections 24 of fuselage are secured to the track 110 such that concavities 127 of the half barrel sections 24 face the floor 150, and bearing edges 122 of the half barrel sections 24 directly contact the track 110. Half barrel sections 24 for upper half barrel sections 40 are moved in a process direction 199 in a crown up position 139. Each indexing unit 130 is designed to physically or communicatively couple with an indexing feature 124 such as an RFID chip, an added feature, such as a pin, or a machined feature, such as a hole or slot in the half barrel section 24. Another embodiment has a scanner as the indexing unit 130 scanning the indexing feature 124, particularly scannable devices like RFID chips, to control the movement of the half barrel section 24 via input into controller 160, which in turns controls operation of drive unit 116. Each of the indexing units 130 includes a complementary feature 134 for insertion into, grasping, or otherwise fitting with an indexing feature 124 facilitating a hard stop when mated.

Indexing is performed at least according to the following description. The half barrel section 24 is carried on the bearing edge 122 upon a track 110 comprising a set of stanchions 112 (e.g., pogos) affixed to the floor 150. The half barrel section 24 was fabricated on a layup mandrel according to precise dimensions. This precise layup enables indexing features 124 to be precisely located in a manufacturing excess 129 of the half barrel section 24.

The half barrel section 24 is indexed to a workstation (similar to workstations 144) configured as NDI stations 371, 371-1 (shown in FIG. 6) in step 222. Within the purview 113-3 of NDI station 371, 371-1, the radius 363-2 (shown in FIG. 4) of the half barrel section 24 is measured hoopwise 370 while micro pulsing 149 through the NDI station 371, 371-1 in step 224. The NDI 371, 371-1 gathered information is conveyed via controller to arches 140, 140-1 for contouring the half barrel section 24 within its purview 113-1, 113-2 in step 226. Conveying the NDI station 371, 371-1 information, regarding radius 363-2 for use in creating desired contour 361, through controller 160 to arches 140, 140-1 for use within the purview 113-1, 113-2 of the arches 140, 140-1 is in step 226. Indexing the half barrel section 24 to the arches 140, 140-1 is completed in step 228. Positioning of wheels 142, 142-1 relative to arches 140, 140-1 to form a nip 420 preliminarily set at gap 421-1 and a radius 363-3 is performed in step 230. Micro pulsing 149 a leading edge 170 of the half barrel section 24 through nip 420 is illustrated by step 232. The nip 420 is set at a second gap compatible with forcing the half barrel section 24 to a desired contour 361 in step 234. The nip 420 is set at a gap 421 to enforce a desired contour 361 upon half barrel section 24 in step 234. Enforcing the desired contour 361 onto the half barrel section 24 within the purview 113-1, 113-2 of arches 140, 140-1 while micro pulsing 149 the half barrel section 24 through the nip 420 set at the second gap, gap 421 is performed in step 236. In some illustrative examples, enforcing the desired contour 361 onto the half barrel section 24 within the purview 113-1, 113-2 of arches 140, 140-1 while micro pulsing 149 the half barrel section 24 through the nip 420 using measured data for the same half barrel section 24 when within the purview 113-3 of NDI station 371, 371-1 is performed in step 236. Purview 113-3 is the width of the work performed by the NDI station 371, 371-1 upon half barrel section 24 during a pause or during a pulse between pauses.

Figure 2B:
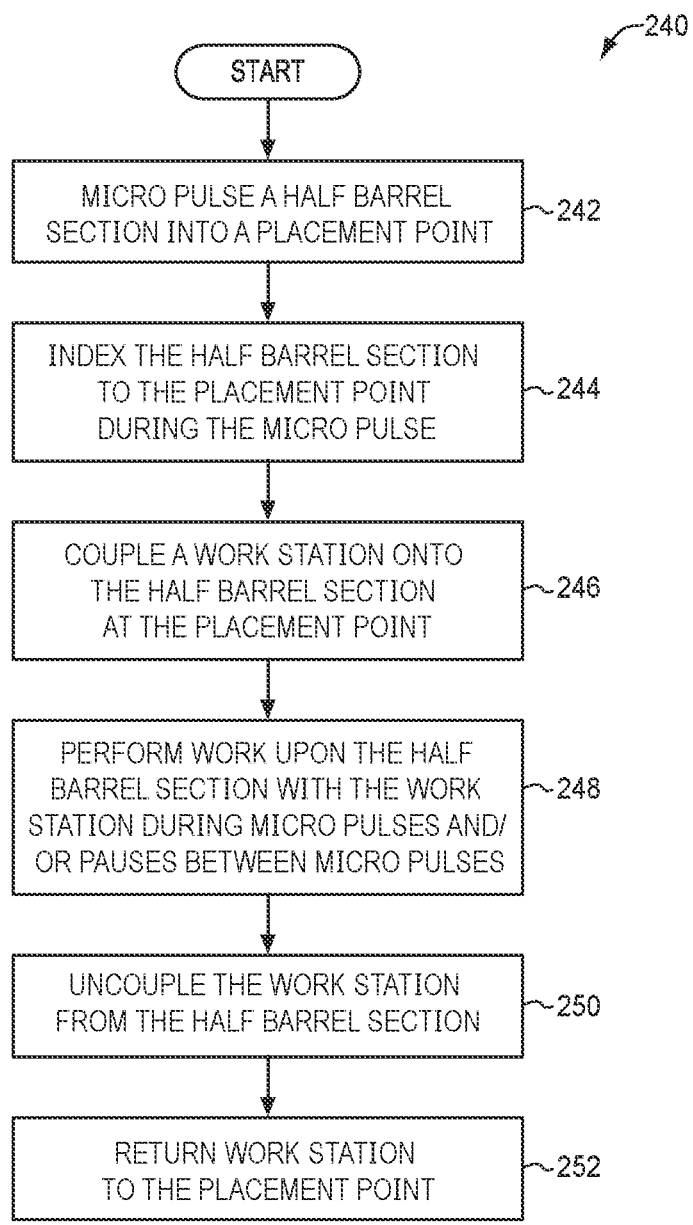
FIG. 2B is a flowchart illustrating a method for coupling a mobile workstation to a half barrel section.

FIG. 2B is a flowchart illustrating a method 240 of operating a fuselage assembly system 100 in an illustrative embodiment. The steps of method 240 are described with reference to fuselage assembly system 100 of FIG. 1A and FIG. 6 through FIG. 6C, but those skilled in the art will appreciate that method 240 may be performed in other systems. The steps of the flowcharts described herein are not all inclusive and may include other steps not shown. The steps described herein may also be performed in an alternative order.

The half barrel section 24 is micro pulsed 149 into a placement point, such as placement point 144-3 or placement point 144-6, in step 242. The half barrel section 24 is indexed to the placement point during the micro pulse 149 in step 244. Workstation 144 installs frames 146 into half barrel section 24. Workstation 144-1 fastens window surrounds 145 into half barrel section 24.

A workstation is coupled onto the half barrel section 24 at the placement point, such as placement point 144-3 or placement point 144-6, in step 246. The workstation coupled onto the half barrel section 24 is a traveling workstation, such as traveling workstation 144-2, traveling workstation 144-4, or traveling workstation 144-5. In some illustrative examples, the traveling workstation 144-2 is coupled at placement point 144-3 in step 246. In some illustrative examples, the traveling workstation 144-4 is coupled at placement point 144-6 in step 246. In some illustrative examples, the traveling workstation 144-5 is coupled at placement point 144-6 in step 246.

Work is performed upon the half barrel section 24 with the workstation during micro pulses 149 and/or pauses between micro pulse 149 in step 248. In some illustrative examples, the traveling workstation 144-2 rides along with half barrel section 24 while performing work during micro pulses 149 and/or pauses between micro pulses 149 in step 248. The traveling workstation 144-2 rides along and separates manufacturing excess 135 from half barrel section 24 after window surrounds 145 and frames 146 are installed. Another embodiment has workstation 144, 144-1 locating frames and/or window surrounds onto half barrel section 24. Then the traveling workstation 144-4 and traveling workstation 144-5 are coupled to half barrel section 24 also as part of step 246.

The workstations 144, 144-1 temporarily fasten the frame 146, window surround 145 and/or door surround 145-1 to half barrel section 24. An embodiment of temporarily fastening includes intermittent installation of final fasteners within workstations 144, 144-1 to tack the frame 146, window surround 145 and/or door surround 145-1 into place. Intermittent fastening includes fastening at every $10^{th}$ or $20^{th}$ fastener or some other type of spacing and using production type fasteners. Another embodiment of temporarily fastening includes intermittent installation of temporary fasteners within workstations 144, 144-1 to tack the frame 146, window surround 145 and/or door surround 145-1 into place. Intermittent fastening includes fastening at every $10^{th}$ or $20^{th}$ fastener or some other type of spacing and using deco type fasteners. The traveling workstation 144-4 and traveling workstation 144-5 include flex track type fastener installation apparatus shown in FIGS. 6A and 6C. The traveling workstation 144-4 and traveling workstation 144-5 vacuum attach to half barrel section 24 and fasten frames 146 and/or window surrounds 145 and/or door surrounds 145-1 to half barrel section 24. The traveling workstation 144-4 and traveling workstation 144-5 travel along with the half barrel section 24 as it micro pulses 149 and/or pauses and even includes possibly passing through workstations 144, 144-1 while performing fastener installation as part of step 248. The traveling workstation 144-2 travels along with the half barrel section 24 like a "hitch hiker" and separates manufacturing excess 135 from half barrel section 24 also part of step 248.

The workstation is uncoupled from the half barrel section 24 at step 250. In some illustrative examples, the traveling workstation 144-2, traveling workstation 144-4 and traveling workstation 144-5 decouple from half barrel section 24 as part of step 250 after fastener installation or trimming is completed. The workstation is returned to the placement point in step 252. In some illustrative examples, the traveling workstation 144-2, traveling workstation 144-4 and traveling workstation 144-5 return to placement point 144-3 and placement point 144-6 (shown in FIG. 6), respectively in step 252. An embodiment has the traveling workstation 144-2, traveling workstation 144-4, and traveling workstation 144-5 traveling back to the placement point 144-3 and placement point 144-6 on their own power with an onboard crawler configuration.

Referring now to FIGS. 6A, 6B, and 6C, retractable wheels (not shown) are arrayed along the first flexible rail 636, 636-1, 636-2 and the second flexible rail 638, 638-1, 638-2 and the carrier 646, 646-1, 646-2. When in crawler configuration, traveling workstation 144-2, traveling workstation 144-4 and traveling workstation 144-5 travel on their own power from the coupled point on half barrel section 24 to another couple point on half barrel section 24 and then recouple. Another configuration has 144-2, traveling workstation 144-4 and traveling workstation 144-5 travel on their own power back to placement point 144-3 and placement point 144-6 as part of step 252. An embodiment may have multiple traveling workstations 144-2, 144-4, and 144-5 travelling along with half barrel section 24 at any one time.

Furthermore, prior to having the windows or doors manufacturing excess 135 removed, the frames 146 and window surround 145 and door surrounds 145-1 are added to stiffen the half barrel section 24 and then windows or doors manufacturing excess 135 is removed.

FIG. 2C is a flowchart illustrating a method of operating a fuselage assembly system 100 in an illustrative embodiment. The steps of method 260 are described with reference to fuselage assembly system 100 of FIG. 1A and FIG. 6, FIG. 6A and FIG. 6C, but those skilled in the art will appreciate that method 260 may be performed in other systems. The steps of the flowcharts described herein are not all inclusive and may include other steps not shown. The steps described herein may also be performed in an alternative order.

The half barrel section 24 is micro pulsed 149 into a workstation, such as workstation 144 or workstation 144-1, in step 262. The half barrel section 24 is indexed to the workstation, workstation 144 or workstation 144-1, during the micro pulse 149 in step 264. A frame 146, window surround 145, and/or door surround 145-1 is placed against half barrel section 24 as part of step 266. In some illustrative examples, the workstations 144, 144-1 locates the frame 146, window surround 145 and/or door surround 145-1 onto half barrel section 24 as part of step 266. Then the workstation, workstation 144 or workstation 144-1, temporarily fastens the frame 146, window surround 145, and/or door surround 145-1 to half barrel section 24 as part of step 268. An embodiment of temporarily fastening includes intermittent installation of final fasteners within the workstation, workstation 144 or workstation 144-1, to tack the frame 146, window surround 145, and/or door surround 145-1 into place. Intermittent fastening includes fastening at every $10^{th}$ or $20^{th}$ fastener of some other type of spacing and using production type fasteners. Another embodiment of temporarily fastening includes intermittent installation of temporary fasteners within the workstation, workstation 144 or workstation 144-1, to tack the frame 146, window surround 145, and/or door surround 145-1 into place. Intermittent fastening includes fastening at every $10^{th}$ or 20 fastener of some other type of spacing and using deco type fasteners. The frame 146, window surround 145, and/or door surround 145-1 is fastened to half barrel section 24 with a fastener installation system as the half barrel section 24 progresses through at least one micro pulse 149 as part of step 270. In some illustrative examples, the fastener installation system takes the form of a traveling workstation. A traveling workstation, traveling workstation 144-4 or traveling workstation 144-5, is coupled to half barrel section 24. The traveling workstation, traveling workstation 144-4 or traveling workstation 144-5, is used to fasten the frame 146, window surround 145, and/or door surround 145-1 to half barrel section 24 as the half barrel section 24 progresses through at least one micro pulse 149 as part of step 270. In some illustrative examples, traveling workstation 144-4 and traveling workstation 144-5 may each be referred to as a fastener installation system with a flex track, or a flex track type fastener installation apparatus.

The workstations 144, 144-1 temporarily fasten the frame 146, window surround 145, and/or door surround 145-1 to half barrel section 24. The traveling workstation 144-4 and traveling workstation 144-5 include flex track type fastener installation apparatus shown in FIGS. 6A, 6B and 6C. The traveling workstations 144-2, 144-4 and 144-5 vacuum attach to half barrel section 24 and fasten frames 146 and/or window surrounds 145 and/or door surrounds 145-1 to half barrel section 24. The traveling workstations 144-2, 144-4 and 144-5 travel along with the half barrel section 24 as it micro pulses 149 and/or pauses and even includes possibly passing through workstations 144, 144-1 while performing fastener installation. The traveling workstation 144-2 travels along with the half barrel section 24 like a "hitch hiker" and separates manufacturing excess 135 from half barrel section 24.

The traveling workstation 144-2, traveling workstation 144-4 and traveling workstation 144-5 decouple from half barrel section 24 after fastener installation or trimming is completed. The traveling workstation 144-2, traveling workstation 144-4 and traveling workstation 144-5 then return to a placement point 144-3, 144-6, respectively. An embodiment has the traveling workstation 144-2, traveling workstation 144-4 and traveling workstation 144-5 traveling back to the placement point 144-3, 144-6 on their own power with an onboard crawler configuration. Retractable wheels (not shown) are arrayed along the first flexible rail 636, 636-1, 636-2 and the second flexible rail 638, 638-1, 638-2 and the carrier 646, 646-1, 646-2. When in crawler configuration, traveling workstation 144-2, traveling workstation 144-4 and traveling workstation 144-5 travel on their own power from the coupled point on half barrel section 24 to another couple point on half barrel section 24 and then recouple. Another configuration has 144-2, traveling workstation 144-4 and traveling workstation 144-5 traveling on their own power back to placement point 144-3, 144-6 as part of step 252. An embodiment may have multiple traveling workstations 144-2, traveling workstations 144-4 and traveling workstations 144-5 travelling along with half barrel section 24 at any one time. Furthermore, prior to having the windows or doors manufacturing excess 135 removed, the frames 146 and window surround 145 and door surrounds 145-1 are added to stiffen the half barrel section 24 and then windows or doors manufacturing excess 135 is removed. While only traveling workstations 144-2, 144-4 and 144-5 are shown, more traveling workstations are possible.

FIG. 3 is a perspective view of a half barrel section 24 of fuselage traveling through fuselage assembly system 100 in an illustrative embodiment. In this embodiment, the half barrel section 24 includes a concavity 127. Track 110 includes multiple stanchions 112 (e.g., pogos) which each include rollers 114 that secure and drive the half barrel section 24 in a process direction 199.

FIG. 3 further depicts a factory floor 150, and inner arch 140-1 and outer arch 140 which are affixed to the factory floor 150. For clarity, workstations 144, 144-1 are omitted from this illustration. To restate, inner arch 140-1 and outer arch 140 could be coupled to workstations 144, 144-1 as an adjunct or as a standalone inner arch 140-1 and outer arch 140. Inner arch 140-1 is dimensioned for contacting an EVIL 128 of a half barrel section 24 with wheels 142-1. Inner arch 140-1 includes base 342, which is fixed in position at the factory floor 150. Inner arch 140-1 further includes wheels 142-1. Each wheel 142-1 is rotatably affixed to the inner arch 140-1, and the wheels 142-1 are distributed circumferentially along the inner arch 140-1. The wheels 142-1 contact IML 128 when contacting IML 128 is needed to push half barrel section 24 into the desired contour 361. In some embodiments, only a subset of wheels 142-1 engages with a half barrel section 24 when portions of the half barrel section 24 are not in desired contour 361.

In another embodiment, in areas/locations where highly precise 3D positioning and contour control are desired, several sets of wheels 142-1, such as pairs of complementary wheels at a circumferential location along the stationary arches 140-1 may be placed into contact with half barrel section 24. Multiple arches 140-1 with accompanied wheels 142-1 are located serially in workstations 144, 144-1 along half barrel section 24 to more precisely enforce desired contour 361. When the half barrel section 24 has desired contour 361, then it has the desired OML 126 and IML 128. In another embodiment, arch 140-1 with wheels 142-1 is included in at least one workstation 144, 144-1. In yet another embodiment, when workstation 144, 144-1 has an arch like structure to accommodate fabrication within workstation 144, 144-1 such as the arch like frames 146 holding drilling and fastener installing devices for frame 146 installation or for window surround 145 and door surround 145-1 installation, wheels 142-1 are added to arch 140-1 like structure to enforce desired contour 361 within workstation 144, 144-1.

In contrast, in areas where a less precisely contoured structure is desired, only one or two sets of wheels 142-1 per arch 140-1 are used, and only one arch 140-1 is employed. Another embodiment only uses arch 140-1 with wheels 142-1 without an OML arch like arch 140 and wheels 142 are utilized to maintain a desired contour 361 from IML 128 contact only. For example, while holding a desired shape for installing frames 146, the half barrel section 24 is held less rigidly to enable frames 146, window surround 145 or door surround 145-1 to be fastened to the half barrel section 24 easily without shimming.

In still further embodiments, wheels 142-1 are placed such that they do not contact an EVIL 128 of the half barrel section 24 unless the half barrel section 24 is out of desired contour 361. Furthermore, an embodiment comprises the wheels 142-1 placed into contact with the half barrel section 24 during a pause between pulses, or during micro pulses 149 or pulses or during stints of continuous motion, but not during other times as the half barrel section 24 moves in the process direction 199.

Outer arch 140 is dimensioned for contacting an OML 126 of a half barrel section 24. Outer arch 140 includes base 352, which is fixed in position at the factory floor 150. Outer arch 140 further includes wheels 142. Each wheel 142 is rotatably affixed to the outer arch 140, and the wheels 142 are distributed circumferentially along the outer arch 140. The wheels 142 contact OML 126 when contacting OML 126 is needed to push half barrel section 24 into the desired cross-sectional contour, desired contour 361. In some embodiments, only a subset of wheels 142 engages with a half barrel section 24 when portions of the half barrel section 24 are not in desired contour 361.

In another embodiment, in areas/locations where highly precise 3D positioning and contour control is desired, several sets of wheels 142, such as pairs of wheels 142 at a circumferential location along the stationary arches 140 may be placed into contact with half barrel section 24. Areas where more precise contour control is needed, wheels 142 and/or 142-1 may be located along arch 140 and arch 140-1 whereas other areas with less precision could have wheels 142 or 142-1 omitted, respectively. Multiple arches 140 with accompanied wheels 142 are located serially in workstations 144, 144-1 along half barrel section 24 to more precisely enforce desired contour 361. In another embodiment, outer arch 140 with wheels 142 is included in at least one workstation 144, 144-1. In yet another embodiment, workstation 144, 144-1 has an arch like structure to accommodate fabrication within workstation 144, 144-1. In such an embodiment, the arches 140, 140-1 hold drilling and fastener installing devices for frame 146 installation or for window surround 145 and door surround 145-1 installation. Wheels 142-1 are added to arch 140-1 to enforce desired contour 361 within workstation 144, 144-1. In contrast, in areas where a less precisely contoured structure is desired, only one or two sets of wheels 142-1 per outer arch 140 with one outer arch 140 is employed. Another embodiment only uses outer arch 140 with wheels 142, without an inner arch 140-1 and wheels 142-1 utilized, to maintain a desired contour 361 from OML 126 contact only. For example, while holding a desired shape for installing frames 146, the half barrel section 24 is held less rigidly to enable frames 146, window surrounds 145 or door surrounds 145-1 to be fastened to the half barrel section 24 easily without shimming.

In still further embodiments, wheels 142, 142-1 are placed such that they do not contact the OML 126 and/or EVIL 128 of the half barrel section 24 unless the half barrel section 24 is out of desired contour 361. Furthermore, an embodiment comprises the wheels 142, 142-1 placed into contact with the half barrel section 24 during a pause between pulses, or during micro pulses 149 or pulses or during stints of continuous motion, but not during other times as the half barrel section 24 moves in the process direction 199.

The stationary arches 140-1 discussed with regard to FIG. 3 are implemented as standalone devices in some embodiments and are integrated with respect to workstations 144, 144-1 in other embodiments.

Figure 4A:
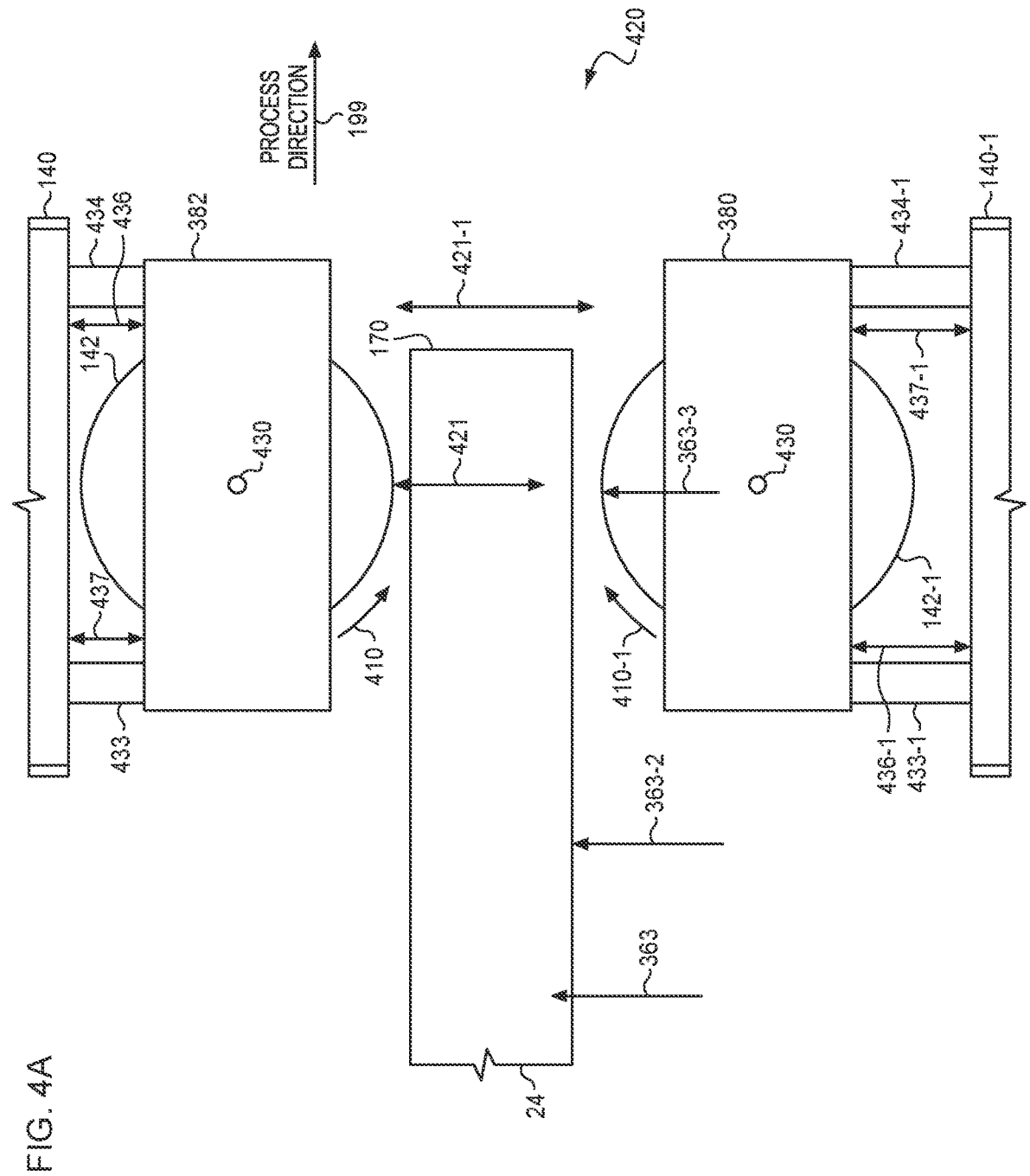

FIG. 4 is an illustration of a step prior to the FIG. 4A and two steps prior to FIG. 4B. Each of FIG. 4, FIG. 4A, and FIG. 4B are based upon a cross-sectional view labeled 4B-4B in FIG. 3. Although cross-sectional view 4B-4B is labeled in FIG. 3, features of arches 140, 140-1 and wheels 142-1, 142 in each of FIG. 4, FIG. 4A, and FIG. 4B can differ from those present in FIG. 3. In FIG. 4, nip 420 is set at gap 421-1 to facilitate leading edge 170 initially passing between wheels 142-1, 142. Leading edge 170 has not yet passed between wheels 142-1, 142. Gap 421-1 is wider than gap 421 to facilitate leading edge 170 initially passing between wheels 142-1, 142 if the half barrel section 24 is at radius 363-2. In this embodiment, radius 363-2 is less than radius 363. Gap 421-1 is wider than gap 421 to facilitate leading edge 170 initially passing between wheels 142-1, 142 if the half barrel section 24 radius is at an uncorrected radius 363-2. In the illustrated embodiment, radius 363-2 is less than radius 363. Wheels 142-1 are also set at a radius 363-3 that is less than radius 363 or radius 363-2. Setting the wheels 142-1, 142 at gap 421-1 and wheels 142-1 at radius 363-3 avoids having leading edge 170 impinge upon wheels 142-1, 142 so that micro pulsing 149 of half barrel section 24 is not blocked by leading edge 170 impinging upon wheels 142-1, 142. Impinging may prevent micro pulsing 149. In a different embodiment, wheels 142-1 are also set at a radius 363-3 when radius 363-2 is greater than radius 363. The radius 363-3 would be set at a radius of 363. In another embodiment, radius 363-2 is greater than 363 at some locations and less than 363 at other locations hoopwise 370 relative to arches 140-1, 140. Hoopwise 370, wheels 142-1, 142 are positioned with an appropriate radius 363-3 and nip 420 with gap 421-1 to be complementary to the radius 363-2.

The arches 140, 140-1, are located after Non-Destructive Inspection station (NDI) 371, 371-1 (shown in FIG. 6). The NDI station 371, 371-1 measure the radius 363-2 of the half barrel section 24 hoopwise 370 during each micro pulse 149. The half barrel section 24 is micro pulsed through the NDI station 371, 371-1. NDI station 371 performs outer NDI inspection upon half barrel section 24 while NDI station 371-1 performs inner NDI inspection upon half barrel section 24. The radius 363-2 is measured hoopwise 370 on half barrel section 24 when half barrel section 24 passes through an NDI station 371, 371-1 either in micro pulse 149 or continuously. This radius measurement could be performed optically, mechanically or by other suitable means. This measurement information establishes the radius 363-2 hoopwise 370 for the half barrel section 24 within the purview 113-3 of NDI station 371, 371-1. This measurement information for the purview 113-3 for half barrel section 24 is passed on via controller 160 for use when that same measured portion of half barrel section 24 is in purview 113-2, 113-1 of arches 140, 140-1, respectively. This measurement information is used to set the radius 363-3 and nip 420 gap 421-1.

FIG. 4A is an illustration of a step prior to the step of FIG. 4B. In FIG. 4A, nip 420 is set at gap 421-1 to facilitate leading edge 170 initially passing between wheels 142-1, 142. Gap 421-1 is wider than gap 421 to facilitate leading edge 170 initially passing between wheels 142-1, 142 if the half barrel section 24 radius is at an uncorrected radius 363-2. In the illustrated embodiment, radius 363-2 is less than radius 363. In another embodiment, radius 363-2 is greater than radius 363. Wheels 142-1 are also set at a radius 363-3 that is less than radius 363 or radius 363-2. Setting the wheels 142-1, 142 at gap 421-1 and wheels 142-1 at radius 363-3 avoids having leading edge 170 impinge upon either wheels 142-1, 142 so that micro pulsing 149 of half barrel section 24 is not blocked by leading edge 170 impinging upon wheels 142-1, 142. Impinging may prevent micro pulsing 149. Half barrel section 24 is then pulsed so that leading edge 170 passes through nip 420.

Then controller 160 instructs the connectors 433, 433-1, 434, 434-1 to form nip 420 at gap 421 as shown in FIG. 4B. Forming the nip 420 at gap 421 is the first step at establishing a desired contour 361 in half barrel section 24. The nip 420 is located after indexing to facilitate leading edge 170 of half barrel section 24 sliding into nip 420 during a micro pulse 149. If needed, wheels 142-1 and 142 then enforce desired contour 361 onto half barrel section 24 by pushing it towards its respective arch 140, 140-1 as it proceeds in process direction 199. Contour enforcement occurs after leading edge 170 passes through nip 420 set at gap 421 after being set at gap 421-1.

Connectors 433, 434 and connectors 433-1, 434-1 are extendable and retractable relative to arch 140-1 and arch 140 in direction 437, 437-1, respectively. The wheels 142-1, 142 are moved relative to arch 140-1 and arch 140 by connectors 433, 434 and connectors 433-1, 434-1, respectively. In FIGS. 4 and 4A, the connectors 433-1 and 434-1 are positioned at length 436-1. In FIGS. 4 and 4A, the connectors 433 and 434 are positioned at length 436. Wheels 142-1 and 142 form gap 421-1 when connectors 433-1 and 434-1 are positioned at length 436-1 and the connectors 433 and 434 are positioned at length 436.

FIG. 4B is a section cut view 4B-4B of wheels 142-1, 142 on arch 140-1 and arch 140, inner and outer respectively, that enforce a desired contour 361. In FIG. 4B, wheels 142-1 are illustrated as contacting the IML 128, while wheels 142 are illustrated as contacting the OML 126. A nip 420 is formed between wheel 142-1 and wheel 142. The wheels 142 spin counter clockwise 410 as the half barrel section 24 proceeds through nip 420 in process direction 199. The wheels 142-1 spin clockwise 410-1 as the half barrel section 24 proceeds through nip 420 in process direction 199. In one embodiment, the gap 421 between wheels 142-1 and wheels 142 is too great for a nip 420 to be formed. In other embodiments, the wheels 142-1 and wheels 142 together form a nip 420 that forces a lengthwise portion 422 (FIG. 1A) of the half barrel section 24 between them into a desired contour 361. When multiple wheels 142-1, 142 circumferentially aligned along an inner arch 140-1 and outer arch 140 perform this action, the nip 420 enforce a desired cross-sectional contour, desired contour 361, along the entirety of the EVIL 128 and/or OML 126 of half barrel section 24. Wheel mounts 380, 382 are employed to hold wheels 142-1 and 142, respectively on an axles 430. Wheel mounts 380, 382 are attached by connectors 433, 434 and connector 433-1, 434-1 to arch 140-1 and arch 140, respectively. Connectors 433, 434 and connectors 433-1, 434-1 are extendable and retractable relative to arch 140-1 and arch 140 in direction 437, 437-1, respectively. The wheels 142-1, 142 are moved relative to arch 140-1 and arch 140 by connectors 433, 434 and connectors 433-1, 434-1, respectively.

The connectors 433, 434 and connectors 433-1, 434-1 are hydraulic, electric, mechanical actuators and/or other suitable actuators. The mechanical actuators are a screw jack or a similar device. The wheels 142-1 and 142 are moved relative to the arches 140, 140-1 by connectors 433-1, 434-1 and connectors 433, 434, respectively, and to place the nip 420 where needed to facilitate contour enforcement within the purview 113-1, 113-2 of arches 140, 140-1 based upon information conveyed to arches 140, 140-1 via indexing from half barrel section 24. Based upon index conveyed information to arches 140, 140-1, the controller 160 instructs the connectors 433, 434 to reach length 436 and connectors 433-1, 434-1 to reach length 438-1. The controller 160 positions the wheels 142, 142-1 to form a nip 420 at the desired radius 363. This process, using the arches 140, 140-1, is used to enforce a desired contour 361 onto the half barrel section 24 within the purview 113 of an adjacent workstation 144, 144-1 during the micro pulse 149 or pause between micro pulses 149. This permits a forcing of half barrel section 24 into desired contour 361 transiently within workstations 144, 144-1 when the half barrel section 24 is out of tolerance.

Figure 4C:
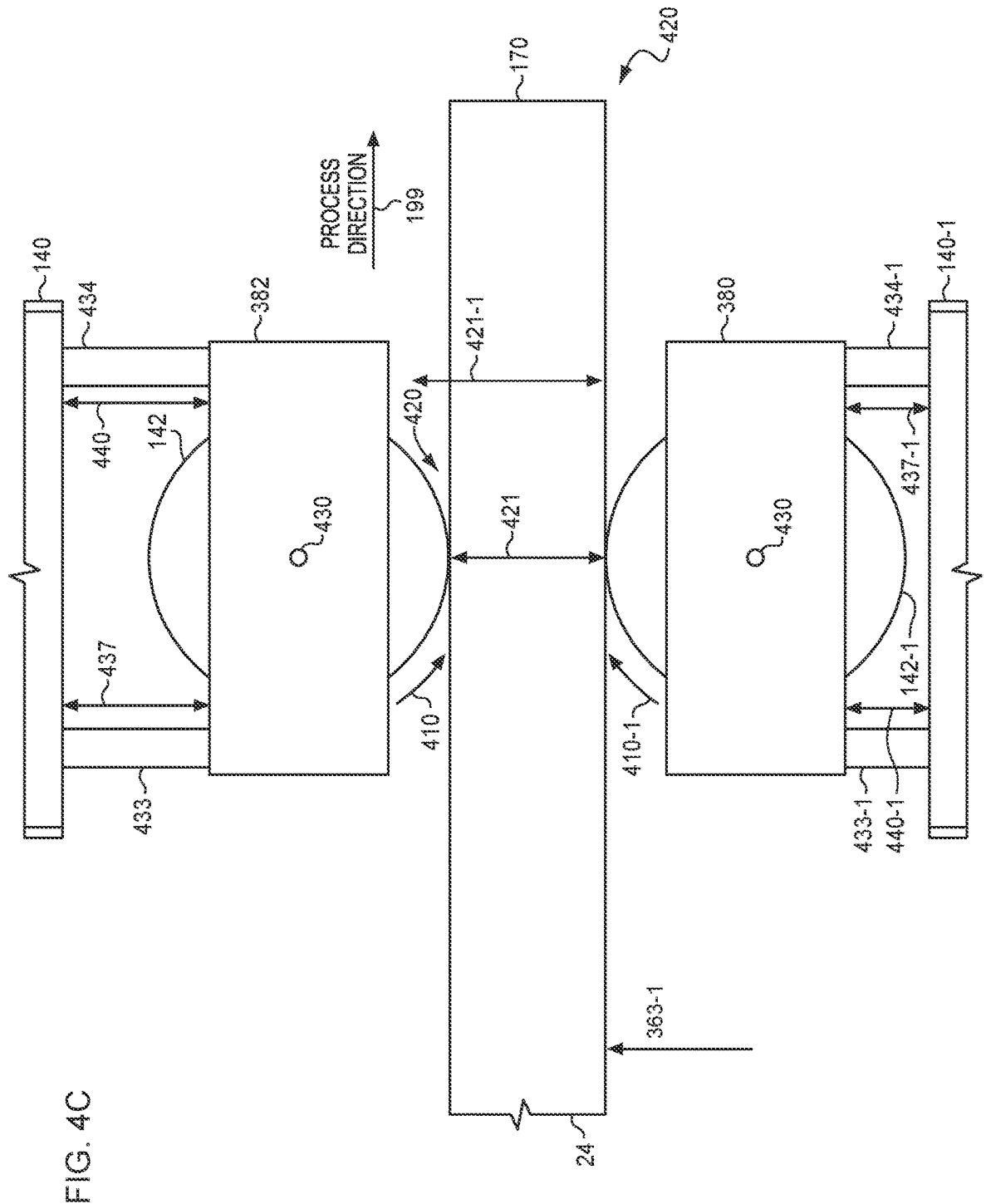

FIG. 4C illustrates enforcing a desired contour 361 in half barrel section 24 with a radius 363-1. Radius 363-1 is less than radius 363. Connectors 433, 434 and connectors 433-1, 434-1 are extendable and retractable relative to arches 140, 140-1 in direction 437, 437-1, respectively. The wheels 142, 142-1 are moved relative to arches 140, 140-1 by connectors 433, 434 and connectors 433-1, 434-1, respectively. The connectors 433, 434 and connectors 433-1, 434-1 are hydraulic, electric, and or mechanical actuators. The mechanical actuators are a screw jack or a similar device. The wheels 142, 142-1 are moved relative to the arches 140, 140-1 by connectors 433-1, 434-1 and connectors 433, 434, respectively, and to place the nip 420 where needed to facilitate contour enforcement within the purview 113-1, 113-2 of arches 140, 140-1.

Contour enforcement is based upon information conveyed to arches 140, 140-1 via indexing from half barrel section 24. Based upon index conveyed information to arches 140, 140-1, the controller 160 instructs the connectors 433, 434 to reach length 440, and connectors 433-1, 434-1 to reach length 440-1. The controller 160 positions the wheels 142, 142-1 to form a nip 420 at the desired radius 363-1. Preliminarily, nip 420 is set at gap 421-1 to facilitate leading edge 170 initially passing between wheels 142, 142-1. Then controller 160 instructs the connectors 433, 433-1, 434, 434-1 to form nip 420 at gap 421. Forming the nip 420 at gap 421 is the first step at establishing a desired contour 361 in half barrel section 24. When the nip 420 is located after indexing, leading edge 170 of half barrel section 24 slides into nip 420 during a micro pulse 149 and, if needed, wheels 142-1 and 142 enforce desired contour 361 onto half barrel section 24, 24 by pushing it towards its respective arch 140, 140-1.

Figure 5:
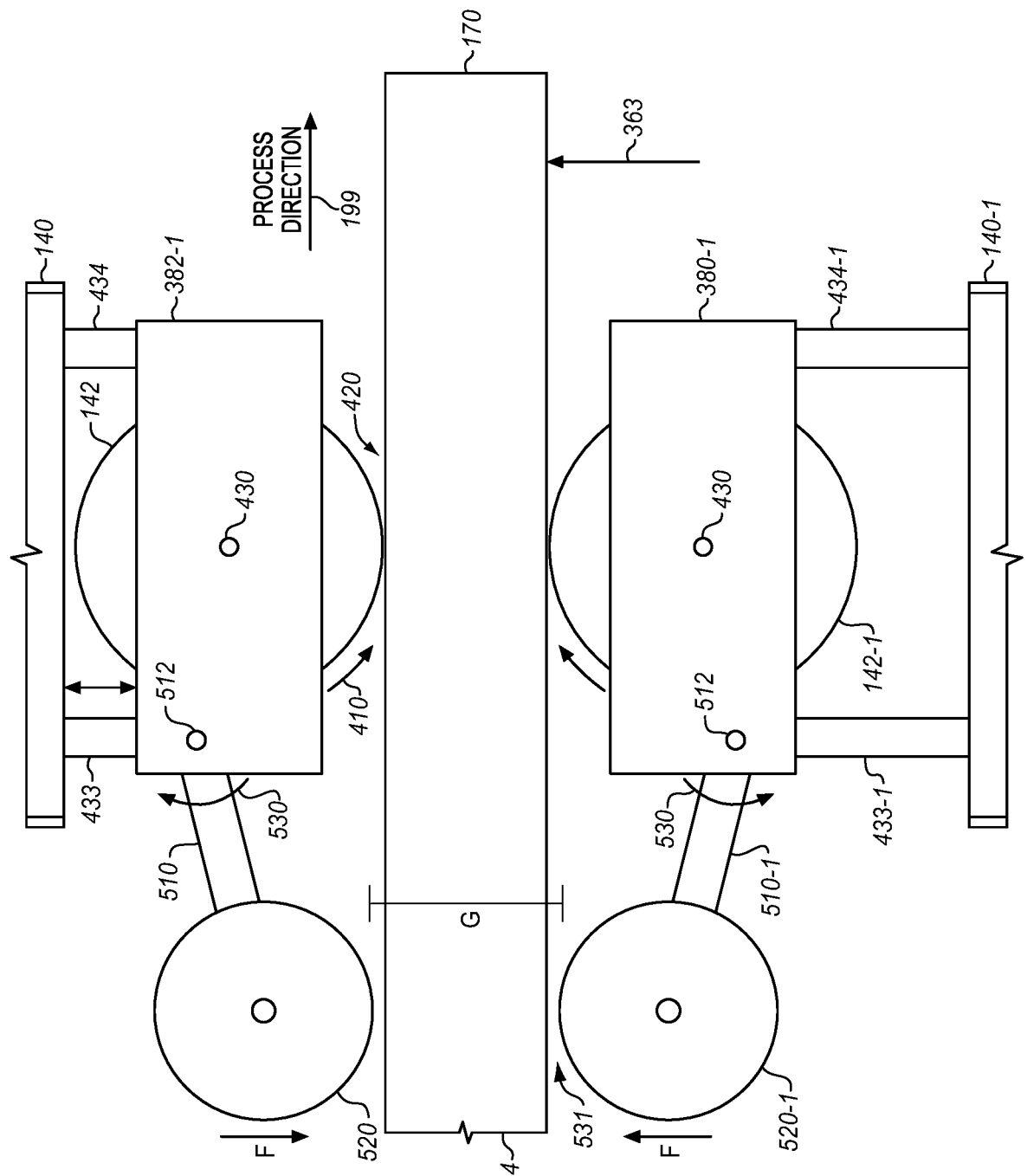

FIG. 5 is a cross-sectional cut view of an illustrative example of wheels 142-1, 142 on inner arch 140-1 and outer arch 140 that enforces a desired contour 361. The cross-sectional view of FIG. 5 is based upon a cross-sectional view labeled 5-5 in FIG. 3. Although cross-sectional view 5-5 is labeled in FIG. 3, features of arches 140, 140-1 and wheels 142-1, 142 in FIG. 5 can differ from those visible in FIG. 3. Additionally, features of arches 140, 140-1 and wheels 142-1, 142 in FIG. 5 can differ from those visible in each of FIG. 4, FIG. 4A, and FIG. 4B. Wheel mounts 380-1 and 382-1 are employed to hold wheels 142-1 and 142, respectively on an axles 430. Wheel mounts 380-1 and 382-1 have been enhanced with intake rollers 520, 520-1 disposed on swing arms 510, 510-1 which pivot about axes 512 upstream of nip 420 and are biased with a default force F towards half barrel section 24. The intake rollers 520, 520-1 are separated by a gap G, and are held in position with a default amount of force F. However, the intake rollers 520, 520-1 are capable of pivoting 530 on swing arms 510, 510-1 about axes 512. Because the swing arms 510, 510-1 are biased to return to a default position with regard to the axes 512, the swing arms 510, 510-1 push/force the intake rollers 520, 520-1 into contact with half barrel section 24. This means that if a new half barrel section 24 is about to enter between arches 140, 140-1 but is not perfectly aligned, the intake rollers 520, 520-1 are capable of pre-contouring half barrel section 24 through pre-nip 531 more gradually into desired contour 361 than with just nip 420. Pre-nip 531 helps bring leading edge 170 of half barrel section 24 into nip 420 as part of a precursor contouring device to avoid a stoppage of process direction 199 by leading edge 170 impingement upon wheels 142-1 or wheels 142, 142-1 for a half barrel section 24 substantially out of tolerance. The leading edge 170 is pre-contoured through pre-nip 531 as a precursor to being placed into desired contour 361 by nip 420.

FIG. 6 is a side view illustrating an example embodiment of fuselage assembly system 100 which includes stationary arches 140-1, 140 that enforce a desired contour 361, and downstream workstations 144, 144-1. The side view of FIG. 6 is based upon a side view labeled 6-6 in FIG. 3. Although cross-sectional view 6-6 is labeled in FIG. 3, features of arches 140, 140-1 in FIG. 6 can differ from those visible in FIG. 3. Additionally, features of arches 140, 140-1 in FIG. 6 can differ from those visible in each of FIG. 4, FIG. 4A, FIG. 4B, and FIG. 5. In this embodiment, a half barrel section 24 of fuselage 12 is carried along stanchions 112, which are mounted to factory floor 150. An inner arch 140-1 and an outer arch 140 enforce a desired contour 361 (shown in FIG. 3) onto the half barrel section 24, which proceeds in a process direction 199 and extends through multiple workstations 144, 144-1. During pauses between micro pulses 149, or during continuous motion, end effectors 148 at the workstations 144, 144-1 perform work on the half barrel section 24 to assemble a completed half barrel section (e.g., 40) for joining with another half barrel section (e.g., 42). In one embodiment, the end effectors 148 operate to install frame 146 or door surround 145-1 and/or window surrounds 145, which stiffen half barrel section 24 and reduce or eliminate the need for additional arches.

Traveling workstations 144-4 and 144-5 are attached in workstation 144 and travels with half barrel section 24 while performing work during micro pulses 149 and/or pauses between micro pulses 149. Traveling workstations 144-4 and 144-5 are, in one example, flex track type systems. Traveling workstations 144-4 include a flex track for installing frame 146 installation fasteners. Traveling workstation 144-5 is a flex track for installing window surround 145 installation fasteners. When placed, the traveling workstation 144-4 and 144-5 drills fastener holes and installs fasteners to attach frames 146 and window surrounds 145.

Referring back to FIG. 1A, the traveling workstation 144-2 separates manufacturing excess 135 from half barrel section 24 after window surrounds 145 and frames 146 are installed. The traveling workstations 144-4, 144-5 travel along with the half barrel section 24 like a "hitch hiker" to a removal point 152, for example, and then are returned to a placement point 144-6 and are loaded/unloaded via a robot or other system for reattachment and further work on another portion of half barrel section 24, or the next half barrel section to pulse down the track 110. An embodiment may have multiple traveling workstations 144-4, 144-5 travelling along with half barrel section 24 at any one time.

FIG. 6A is a more detailed illustration of traveling workstation 144-5 coupled to half barrel section 24. The flexible-rail system 622 comprises a plurality of attachment vacuum cups (not visible) releasably affixed at spaced intervals along the length of a first flexible rail 636 and a second flexible rail 638 to half barrel section 24. A vacuum source 644 is connected by hoses (not shown) to vacuum cups (not visible) to provide attachment force. One vacuum source 644 serves vacuum cups (not visible) on first flexible rail 636 while the other vacuum source 644 serves the vacuum cups (not visible) on second flexible rail 638. Two vacuum source 644 locations are shown whereas one may be sufficient. The second flexible rail 638 is preferably parallel to and spaced apart from the first flexible rail 636. The first flexible rail 636 and the second flexible rail 638 are located beyond the perimeter of the window surround fastener installation locations 668. While a number of fastener installation locations 668 are shown, the actual number of fastener installation locations 668 can be more or less. Other suitable attachment components may also be used, such as magnetic coupling to an inner ferromagnetic surface. First flexible rail 636 and the second flexible rail 638 are connected by spacer 640 and spacer 642. First flexible rail 636 and the second flexible rail 638 are drawn into a shape complementary to half barrel section 24 when vacuum or magnetically coupled. Traveling workstation 144-5 is mounted upon half barrel section 24, for example, in workstation 144-1.

A drilling tool 650 and fastener install tool 648 is located in a carrier 646. Carrier 646 is moveably coupled 662 to the first flexible rail 636 and the second flexible rail 638. The moveably coupling includes a rack and pinion system or similar system not shown. Lateral alignment 654 moves the drilling tool 650 and fastener install tool 648 laterally across the carrier 646 relative to the first flexible rail 636 and the second flexible rail 638. A lateral screw jack system is shown, but other actuations systems are possible. A fastener feeder 652 feeds fasteners to fastener install tool 648 for driving into fastener installation locations 668 created by drilling tool 650 in half barrel section 24. Another embodiment has the vacuum cups (not visible) released from half barrel section 24 and then manually or automatically returned to placement point 144-6.

FIG. 6B illustrates traveling workstation 144-2 coupled to half barrel section 24. The flexible-rail system 622-1 comprises a plurality of attachment vacuum cups (not visible) releasably affixed at spaced intervals along the length of a first flexible rail 636-1 and a second flexible rail 638-1 to half barrel section 24. A vacuum source 644-1 is connected by hoses (not shown) to vacuum cups (not visible) to provide attachment force. One vacuum source 644-1 serves vacuum cups (not visible) on first flexible rail 636-1 while the other vacuum source 644-1 serves the vacuum cups (not visible) on second flexible rail 638-1. Two vacuum source 644-1 locations are shown whereas one may be sufficient. The second flexible rail 638-1 is preferably parallel to and spaced apart from the first flexible rail 636-1. The first flexible rail 636-1 and the second flexible rail 638-1 are located beyond the perimeter of the window surround fastener installation locations 668. While a number of fastener installation locations 668 are shown, the actual number of fastener installation locations 668 can be more or less. Other suitable attachment components may also be used, such as magnetic coupling to an inner ferromagnetic surface. First flexible rail 636-1 and the second flexible rail 638-1 are connected by spacer 640-1 and spacer 642-1. First flexible rail 636 and the second flexible rail 638-1 to half barrel section 24 are drawn into a shape complementary to half barrel section 24 when vacuum or magnetically coupled. Traveling workstation 144-2 is mounted upon half barrel section 24, for example, in workstation 144-1.

A rough trimming tool 650-1 and a fine trimming tool 648-1 are located in a carrier 646-1. Carrier 646-1 is moveably coupled 662-1 to the first flexible rail 636-1 and the second flexible rail 638-1. The moveably coupling includes a rack and pinion system or similar system not shown. Lateral alignment 654-1 moves the rough trimming tool 650-1 and the fine trimming tool 648-1 laterally across the carrier 646-1 relative to the first flexible rail 636-1 and the second flexible rail 638-1. A lateral screw jack system is shown, but other actuations systems are possible here. A guidance system 652-1 guides the rough trimming tool 650-1 and a fine trimming tool 648-1. The rough trimming tool 650-1 provides the first pass of the trimmer to separate the manufacturing excess 135 from half barrel section 24. The fine trimming tool 648-1 creates the final trim line 664 within tolerance. Final trim line 664 is within a perimeter formed by fastener installation locations 668 and when completed forms a cutout of manufacturing excess 135. Rough trimming tool 650-1 and fine trimming tool 648-1 are shown trimming in direction 670 initially. Rough trimming tool 650-1 and fine trimming tool 648-1 then progress in direction 672, 674, 676. In other embodiments, rough trimming tool 650-1 and fine trimming tool 648-1 progress in direction 670, 672, 674, 676 in an order of any combination of directions 670, 672, 674, 676. Rough trimming tool 650-1 and fine trimming tool 648-1, in another embodiment, progress in a direction opposite to direction 670, 672, 674, 676. Another embodiment has the vacuum cups (not visible) released from half barrel section 24 and then manually or automatically returned to placement point 144-3.

FIG. 6C illustrates traveling workstation 144-4 coupled to half barrel section 24. The flexible-rail system 622-2 comprises a plurality of attachment vacuum cups (not visible) releasably affixed at spaced intervals along the length of a first flexible rail 636-2 and a second flexible rail 638-2 to half barrel section 24. A vacuum source 644-2 is connected by hoses to vacuum cups (not visible) to provide attachment force. One vacuum source 644-2 serves vacuum cups (not visible) on first flexible rail 636-2 while the other vacuum source 644-2 serves the vacuum cups (not visible) on second flexible rail 638-2. Two vacuum source 644-2 locations are shown whereas one may be sufficient. The second flexible rail 638-2 is preferably parallel to and spaced apart from the first flexible rail 636-2. The first flexible rail 636-2 and the second flexible rail 638-2 are located roughly parallel to frame 146 fastener installation locations 668. An embodiment has first flexible rail 636-2 on one side of fastener installation locations 668 and second flexible rail 638-2 on the opposite side. While a number of fastener installation locations 668 are shown, the actual number of fastener installation locations 668 are more or less. Other suitable attachment components may also be used, such as magnetic coupling to an inner ferromagnetic surface. First flexible rail 636-2 and the second flexible rail 638-2 are connected by spacer 640-2 and spacer 642-2. First flexible rail 636-2 and the second flexible rail 638-2 to half barrel section 24 are drawn into a shape complementary to half barrel section 24 when vacuum or magnetically coupled. Traveling workstation 144-4 is mounted upon half barrel section 24 in workstation 144.

A drilling tool 650-2 and fastener install tool 648-2 are located in a carrier 646-2. Carrier 646-2 is moveably coupled 662-2 to the first flexible rail 636-2 and the second flexible rail 638-2. The moveably coupling includes a rack and pinion system or similar system not shown. Lateral alignment 654-2 moves the drilling tool 650-2 and fastener install tool 648-2 laterally across the carrier 646-2 relative to the first flexible rail 636-2 and the second flexible rail 638-2. A lateral screw jack system 658 is shown, but other actuations systems are possible here. A fastener feeder 652-2 feeds fasteners to fastener install tool 648-2 for driving into fastener installation locations 668 created by drilling tool 650-2 in half barrel section 24. Carrier 646-2 moves in a hoopwise direction 675 on first flexible rail 636-2 and second flexible rail 638-2 during fastener installation. Hoopwise direction 675 is parallel to frame 146.

An embodiment has the first flexible rail 636-2 and the second flexible rail 638-2 extending in hoopwise direction 675 from bearing edge 122 to bearing edge 122 across the crown up position 139 or keel up position 137 of the half barrel section 24. This embodiment has more than the one each of spacer 640-2 and spacer 642-2. This embodiment has a spacer 640-2 or spacer 642-2 arrayed in several locations along the hoopwise direction 675 including at least near each bearing edge 122 and near the crown up position 139 or keel up position 137 of the half barrel section 24. An embodiment has traveling workstation 144-4 in a crawler configuration. Retractable wheels (not visible) are arrayed along the first flexible rail 636-2 and the second flexible rail 638-2 and the carrier 646-2. The crawler version of traveling workstation 144-4 is located upon half barrel section 24 and then perform fastener installation to join frame 146 to half barrel section 24. Then the wheels (not visible) are deployed and the vacuum cups (not visible) are released from half barrel section 24. The traveling workstation 144-4 then crawls upon wheels (not visible) along half barrel section 24 towards placement point 144-6. Controller 160 directs the crawling of the traveling workstation 144-4 along the half barrel section 24. Another embodiment has the vacuum cups (not visible) of traveling workstations 144-2, 144-4, 144-5 released from half barrel section 24 and then manually or automatically return traveling workstations 144-2, 144-4, 144-5 to placement point 144-6.

EXAMPLES

In the following examples, additional processes, systems, and methods are described in the context of a fuselage assembly system.

Figure 7:
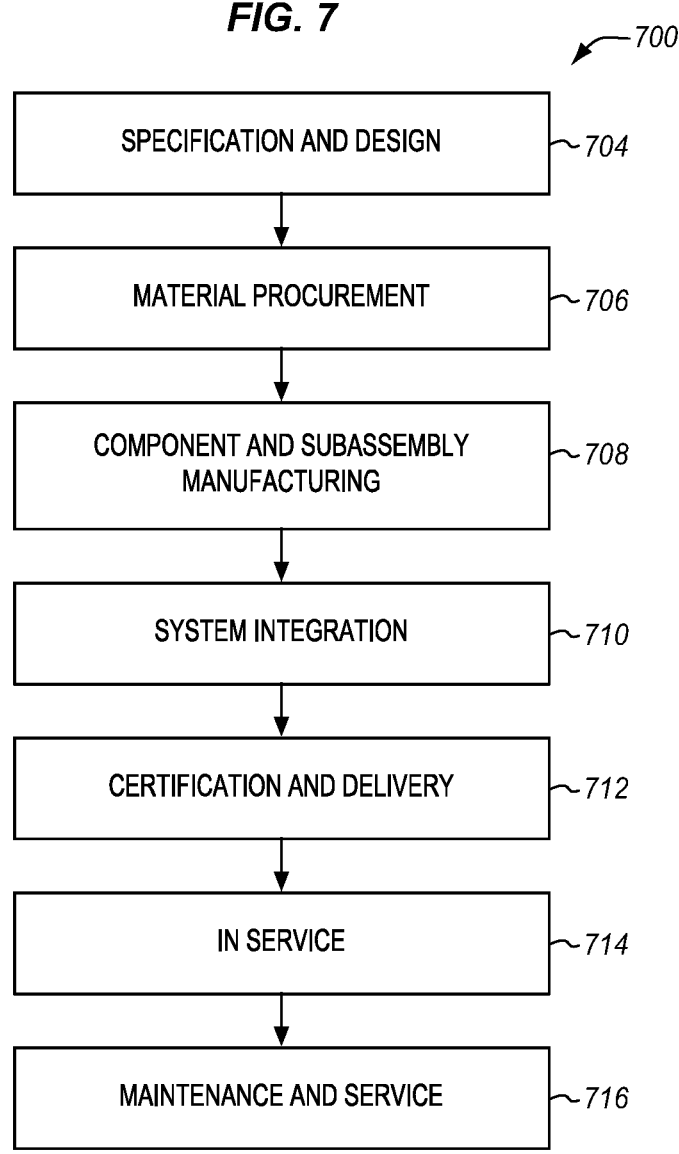
FIG. 7 is a flow diagram of aircraft production and service methodology in an illustrative embodiment.
Figure 8:
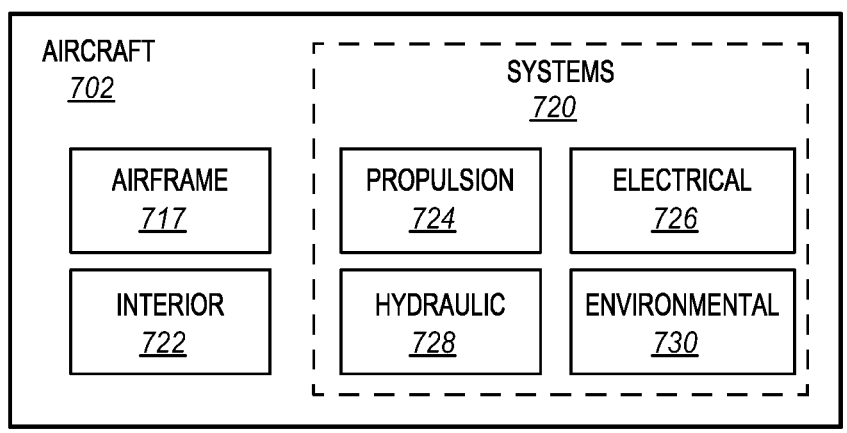
FIG. 8 is a block diagram of an aircraft in an illustrative embodiment.

Referring more particularly to the drawings, embodiments of the disclosure may be described in the context of aircraft manufacturing and service in method 700 as shown in FIG. 7 and an aircraft 702 as shown in FIG. 8. Aircraft 702 is, in one embodiment, the same as aircraft 10 of FIG. 1. During pre-production, method 700 may include specification and design 704 of the aircraft 702 and material procurement 706. During production, component and subassembly manufacturing 708 and system integration 710 of the aircraft 702 takes place. Thereafter, the aircraft 702 may go through certification and delivery 712 in order to be placed in service 714. While in service by a customer, the aircraft 702 is scheduled for routine work in maintenance and service 717 (which may also include modification, reconfiguration, refurbishment, and so on). Apparatus and methods embodied herein may be employed during any one or more suitable stages of the production and service described in method 700 (e.g., specification and design 704, material procurement 706, component and subassembly manufacturing 708, system integration 710, certification and delivery 712, service 714, maintenance and service 717) and/or any suitable component of aircraft 702 (e.g., airframe 717, systems 720, interior 722, propulsion system 724, electrical system 726, hydraulic system 728, environmental system 730).

Each of the processes of method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, the aircraft 702 produced by method 700 may include an airframe 717 with a plurality of systems 720 and an interior 722. Examples of systems 720 include one or more of a propulsion system 724, an electrical system 726, a hydraulic system 728, and an environmental system 730. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 700. For example, components or subassemblies corresponding to component and subassembly manufacturing 708 may be fabricated or manufactured in a manner similar to components or subassemblies produced while the aircraft 702 is in service. Also, one or more apparatus embodiments, method embodiments, or a combination thereof may be utilized during the subassembly manufacturing 708 and system integration 710, for example, by substantially expediting assembly of or reducing the cost of an aircraft 702. Similarly, one or more of apparatus embodiments, method embodiments, or a combination thereof may be utilized while the aircraft 702 is in service, for example and without limitation during the maintenance and service 716. Thus, the invention may be used in any stages discussed herein, or any combination thereof, such as specification and design 704, material procurement 706, component and subassembly manufacturing 708, system integration 710, certification and delivery 712, service 714, maintenance and service 716 and/or any suitable component of aircraft 702 (e.g., airframe 717, systems 720, interior 722, propulsion system 724, electrical system 726, hydraulic system 728, and/or environmental system 730).

In one embodiment, a part comprises a portion of airframe 717, and is manufactured during component and subassembly manufacturing 708. The part may then be assembled into an aircraft in system integration 710, and then be utilized in service 714 until wear renders the part unusable. Then, in maintenance and service 716, the part may be discarded and replaced with a newly manufactured part. Inventive components and methods may be utilized throughout component and subassembly manufacturing 708 in order to manufacture new parts.

Further, the disclosure comprises examples according to the following clauses:

Clause 1. A method for assembling a section of a fuselage 12 of an aircraft 10, the method comprising: pulsing a half barrel section 24 of the fuselage 12 along a track 110 in a process direction 199; utilizing an indexing feature 124 associated with the half barrel section 24 to determine a desired contour 361 for a portion of the half barrel section 24; and enforcing the desired contour 361 onto the half barrel section 24 using components that enforce an inner mold line 128 and components that enforce an outer mold line 126 when the half barrel section 24 is out of tolerance from the desired contour 361.

Clause 2. The method of clause 1 wherein enforcing the desired contour 361 onto the half barrel section 24 comprises: extending a plurality of wheels 142-1 from a first arch 140-1 to enforce the inner mold line 128; and extending a plurality of wheels 142 from a second arch 140 to enforce the outer mold line 126.

Clause 3. The method of clause 1 further comprising: progressing the half barrel section 24 in a process direction 199 through a nip 420 to enforce desired contour 361.

Clause 4. The method of clause 3 further comprising: progressing a half barrel section 24 in the process direction 199 through a pre-nip 531 prior to progressing into the nip 420.

Clause 5. The method of clause 1 further comprising: determining a radius of the half barrel section 24 using non-destructive inspection NDI.

Clause 6. The method of clause 1 further comprising: determining a radius of the half barrel section 24 using non-destructive inspection; and setting a nip 420 to a gap 421-1 and a desired contour 361 using the contour from the NDI, the nip 420 defined by the plurality of wheels 142-1 from a first arch 140-1 extendible along the inner mold line 128 and a plurality of wheels 142 from a second arch 140 extendible along the outer mold line 126.

Clause 7. The method of clause 1 further comprising: performing work on the half barrel section 24, within a workstation 144, 144-1 disposed along the track 110, while the desired contour 361 is enforced.

Clause 8. The method according to clause 7 wherein performing work comprises installing a frame 146 onto the half barrel section 24 while the desired contour 361 is enforced.

Clause 9. The method according to clause 7 wherein performing work comprises installing one or more of a door surround 145-1 and a window surround 145 while the desired contour 361 is enforced.

Clause 10. The method of clause 1 wherein the desired contour 361 being enforced is a cross sectional contour.

Clause 11. The method of clause 1 wherein enforcing the desired contour 361 onto the half barrel section 24 comprises: placing the wheels 142-1 of the first arch 140-1 into contact with the inner mold line 128 of the half barrel section 24 to enforce the desired contour 361; and placing the wheels 142 of the second arch 140 into contact with the outer mold line 126 of the half barrel section 24 to enforce the desired contour 361.

Clause 12. The method of clause 2 further comprising retracting the wheels 142, 142-1 from the half barrel section 24 during pauses between pulses of the half barrel section 24.

Clause 13. The method of clause 1 further comprising securing the half barrel section 24 to the track 110 such that a concavity 127 of the half barrel section 24 face a factory floor 150, and bearing edges 122 of the half barrel section 24 contact the track 110.

Clause 13 A. The method of clause 1 wherein utilizing an indexing feature 124 associated with the half barrel section 24 to determine a desired contour 361 comprises: mating complementary features 134 at an indexing unit 130 with the indexing feature 124; operating a controller 160 to determine the desired contour 361 associated with the mating; and based on the determining, causing a plurality of wheels 142-1 to extend from a first arch 140-1 to enforce the inner mold line 128, and a plurality of wheels 142 to extend from a second arch 140 to enforce the outer mold line 126.

Clause 14. A portion of an aircraft 10 assembled according to the method of clause 1.

Clause 15. A system 100 for assembling a half barrel section 24 of fuselage 12, the system 100 comprising: a track 110 configured to engage opposing bearing edges 122 of the half barrel section 24; a drive unit 116 that moves the half barrel section 24 along the track 110; and a first component positionable to engage an inner mold line 128 of the half barrel section 24 to enforce a desired contour 361 for the half barrel section 24; and a second component positionable to engage an outer mold line 126 of the half barrel section 24 to enforce the desired contour 361 for the half barrel section 24.

Clause 16. The system 100 according to clause 15 wherein: the first component comprises a first arch 140-1 further comprising wheels 142-1 that extend from the first arch 140-1 to enforce the desired contour 361 upon the inner mold line 128; and the second component comprises a second arch 140 further comprising wheels 142 that descend from the second arch 140 to enforce the desired contour 361 upon the outer mold line 126.

Clause 17. The system 100 according to clause 16 wherein the wheels 142-1 of the first arch 140-1 and the wheels 142 of the second arch 140 oppose to form a nip 420, the nip 420 operable in moving the half barrel section 24 along the track 110.

Clause 18. The system 100 according to clause 16 wherein: the first arch 140-1 is shaped substantially complementary to the inner mold line 128 of a half barrel section 24; and the second arch 140 is shaped substantially complementary to the outer mold line 126 of a half barrel section 24.

Clause 19. The system 100 of clause 16 wherein: a first portion of the wheels 142-1 are mounted circumferentially about the first arch 140-1; and a second portion of the wheels 142 are mounted circumferentially about the second arch 140.

Clause 20. The system 100 of clause 15 wherein the drive unit 116 is operable to pulse the half barrel section 24 of fuselage 12 synchronously in a process direction 199 along the track 110 while holding the half barrel section 24 such that concavity 127 of the half barrel section 24 faces a floor 150 of a factory, while the bearing edges 122 of the half barrel section 24 contact the track 110.

Clause 21. The system 100 of clause 20 wherein the system is operable to pulse the half barrel section 24 while the wheels 142, 142-1 engage the half barrel section 24 and enforce the desired contour 361.

Clause 22. The system 100 of clause 15 further comprising a plurality of stanchions 112, the stanchions 112 elevating the track 110 from a factory floor 150.

Clause 23. The system 100 of clause 15 wherein the track 110 comprises a plurality of rollers 114, the rollers 114 operable for movement of the half barrel section 24 along the track 110.

Clause 24. The system 100 of clause 16 wherein: the first arch 140-1 is stationary and mounted to a factory floor 150; and the second arch 140 is stationary and mounted to the factory floor 150.

Clause 25. The system 100 of clause 16 wherein at least one of the first arch 140-1 and the second arch 140 are mobile with respect to the track 110.

Clause 26. The system 100 of clause 16 further comprising a controller 160, the controller 160 programmed to control the respective extension and descending of the wheels 142-1, 142 according to a desired contour 361 stored within the controller 160.

Clause 27. The system 100 of clause 15 further comprising a non-destructive inspection workstation operable to determine a hoopwise radius 363 of a portion of the half barrel section 24 during a pause between micro pulses 149 of the half barrel section 24 along the track 110.

Clause 28. The system 100 of clause 17 further comprising: a plurality of swing arms 510, 510-1, a first portion pivotably mounted to the first arch 140-1 and a second portion pivotably mounted to the second arch 140 and opposing the first portion; a plurality of intake rollers 520, 520-1 mounted to respective swing arms 510, 510-1 distal from the first arch 140-1 and the second arch 140, the swing arms 510, 510-1 biased to form a pre-nip 531 for the half barrel section 24.

Clause 29. The system 100 of clause 28 wherein the biasing of the pre-nip 531 is of sufficient force to pre-contour the half barrel section 24 prior to engagement of the wheels 142, 142-1.

Clause 30. A method for assembling a half barrel section 24 of a fuselage 12, the method comprising: securing the half barrel section 24 of fuselage 12 to a track 110 such that concavities 127 of the half barrel section 24 face a factory floor 150, and bearing edges 122 of the half barrel section 24 contact the track 110; micropulsing the half barrel section 24 along the track 110 in a process direction 199; enforcing inner mold line 128 and outer mold line 126 on a piecewise portion (195) of the half barrel section 24 via arches 140, 140-1 disposed along the track 110 to define a desired contour 361 for the half barrel section 24; and performing work on the piecewise portion (195) of the half barrel section 24 while the inner mold line 128 and outer mold line 126 are enforced.

Clause 31. The method according to clause 30 wherein performing work comprises attaching at least one structural component to the half barrel section 24 to retain the desired contour 361, the at least one structural component comprising at least one of a frame 146, a window surround 145, and a door surround 145-1.

Clause 32. A method for fuselage 12 fabrication, said method comprising: indexing a leading edge 170 portion of a half barrel section 24 of a fuselage 12 to a non-destructive inspection workstation of a fuselage assembly system 100; determining an inner mold line 128 and an outer mold line 126 for the leading edge 170 portion of the half barrel section 24; configuring a position of wheels 142-1 of a first wheeled arch 140-1 based on the inner mold line 128 and a position of wheels 142 of a second wheeled arch 140 based on the outer mold line 126 to form a nip 420, the nip 420 operable to accept the leading edge 170 portion therebetween; operating the nip 420 formed by the wheels 142-1 of the first wheeled arch 140-1 and the wheels 142 of the second wheeled arch 140 to index the leading edge 170 portion of the half barrel section 24 to the first wheeled arch 140-1 and second wheeled arch 140; and moving the wheels 142-1, 142 with respect to the first wheeled arch 140-1 and with respect to the second wheeled arch 140 to enforce a desired contour 361 for the leading edge 170 portion of the half barrel section 24.

Clause 33. A fuselage assembly system 100 comprising: a track 110 configured to engage bearing edges 122 of a half barrel section 24 of a fuselage 12; a first arch 140-1 having a shape complementary to an inner mold line 128 of the half barrel section 24; a second arch 140 having a shape complementary to an outer mold line 126 of the half barrel section 24; a plurality of wheels 142-1, 142 including a first portion of wheels 142-1 disposed about said first arch 140-1 and extendable with respect to said first arch 140-1 to engage the inner mold line 128, and a second portion of wheels 142 disposed about said second arch 140 and extendable with respect to said second arch 140 to engage the outer mold line 126; a non-destructive inspection NDI workstation operable to inspect the half barrel section 24; and a controller 160, said controller 160 operable to: utilize data from the non-destructive inspection (NDI) workstation to position a leading edge 170 of the half barrel section 24 with respect to said wheels 142-1, 142 via a drive unit 116; and extend said wheels 142-1, 142 to enforce a desired contour 361 for the leading edge 170 of the half barrel section 24.

Clause 34. A method for fuselage 12 assembly comprising: micropulsing a half barrel section 24 of a fuselage 12 through one or more workstations 144 dispersed along the track 110 of a fuselage assembly system 100, the micropulsing based on indexing features 124 associated with the half barrel section 24; recognizing, via at least one of the indexing features 124, that the half barrel section 24 is indexed to a placement point 144-3; coupling a traveling workstation 144-2, 144-4, 144-5 to the half barrel section 24; performing work on the half barrel section 24 with the traveling workstation 144-2, 144-4, 144-5 during one or more micro pulses 149 and pauses between micro pulses 149;

Clause 35. The method of clause 34 further comprising: recognizing, via at least one of the indexing features 124, that the half barrel section 24 is indexed to a removal point 152; and decoupling the traveling workstation 144-2, 144-4, 144-5 from the half barrel section 24.

Clause 36. A fuselage assembly system 100 comprising: a track 110 configured to engage bearing edges 122 of a half barrel section 24 of a fuselage 12; a drive unit 116 capable of moving the half barrel section 24s along the track 110; an indexing unit 130 operable to recognize, via at least one indexing feature 124 in the half barrel section 24, that a relevant portion of the half barrel section 24 is indexed to a placement point 144-3; a traveling workstation 144-2, 144-4, 144-5 operable to be coupled to the half barrel section 24, the traveling workstation 144-2, 144-4, 144-5 operable to perform work on the half barrel section 24 during one or more micro pulses 149 and pauses between micro pulses 149 of the half barrel section 24 along the track 110.

Clause 37. A method for fuselage 12 assembly comprising: micropulsing a portion of a half barrel section 24 of a fuselage 12 into a workstation 144, 144-1 placed along the track 110 of a fuselage assembly system 100; utilizing at least one indexing feature 124 to index the half barrel section 24 with respect to the workstation 144, 144-1; placing a component to be attached to the half barrel section 24 against the half barrel section 24; temporarily attaching the component to the half barrel section 24; coupling a traveling workstation 144-2, 144-4, 144-5 to the half barrel section 24; fastening the component to the half barrel section 24 with the traveling workstation 144-2, 144-4, 144-5 during one or more subsequent micro pulses 149 and pauses between micro pulses 149 of the half barrel section 24 along the track 110.

Clause 38. The method according to clause 37 further comprising: recognizing, via at least one of the indexing features 124, that a relevant portion of the half barrel section 24 is indexed to a removal point 152; verifying that the fastening is completed; and decoupling the traveling workstation 144-2, 144-4, 144-5 from the half barrel section 24.

Clause 39. A fuselage assembly system 100 comprising: a track 110 configured to engage bearing edges 122 of a half barrel section 24 of a fuselage 12; a drive unit 116 capable of moving the half barrel section 24s along the track 110; an indexing unit 130 operable to recognize, via at least one indexing feature 124 in the half barrel section 24, that a relevant portion of the half barrel section 24 is indexed to a placement point 144-3; a workstation 144 operable to temporarily attach a component to the half barrel section 24; and a traveling workstation 144-2, 144-4, 144-5 operable to be coupled to the half barrel section 24, the traveling workstation 144-2, 144-4, 144-5 operable to fasten the component to the half barrel section 24 during one or more micro pulses 149 and pauses between micro pulses 149 of the half barrel section 24 along the track 110.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A system configured to assemble a half barrel section of fuselage, the system comprising:
    a track configured to engage bearing edges of the half barrel section;
    a drive unit configured to move the half barrel section along the track;
    a first arch that comprises first wheels that extend from the first arch configured to:
        engage an inner mold line of the half barrel section; and
        enforce a desired contour of the inner mold line of the half barrel section; and
    a second arch that comprises second wheels that descend from the second arch configured to:
        engage an outer mold line of the half barrel section; and
        enforce a desired contour of the outer mold line of the half barrel section.

2. The system of claim 1, further comprising:
    a plurality of swing arms, a first portion pivotably mounted to the first arch and a second portion pivotably mounted to the second arch and opposing the first portion; and
    a plurality of intake rollers mounted to respective swing arms distal from the first arch and the second arch, the swing arms biased to form a pre-nip for the half barrel section.

3. The system of claim 2, wherein biasing of the pre-nip is of sufficient force to pre-contour the half barrel section prior to engagement of the first wheels or the second wheels.

4. The system of claim 1, wherein the first wheels that extend from the first arch and the second wheels that descend from the second arch oppose and form a nip, the nip configured to move the half barrel section along the track.

5. The system of claim 1, wherein:
    the first arch is shaped complementary to the inner mold line of the half barrel section; and
    the second arch is shaped complementary to the outer mold line of the half barrel section.

6. The system of claim 1, wherein the drive unit is operable to pulse the half barrel section of fuselage synchronously in a process direction along the track while holding the half barrel section such that concavity of the half barrel section faces a floor of a factory, while bearing edges of the half barrel section contact the track.

7. The system of claim 1, wherein the system is operable to pulse the half barrel section while the first wheels of the first arch and the second wheels of the second arch engage the half barrel section and enforce the desired contour.

8. The system of claim 1, further comprising a plurality of stanchions, the stanchions elevating the track from a factory floor.

9. The system of claim 1, wherein the track comprises a plurality of rollers, the rollers operable for movement of the half barrel section along the track.

10. The system of claim 1, further comprising a controller, the controller programmed to store the desired contour and control an extension or retraction of the first wheels or the second wheels.

11. A method for assembling a half barrel section of a fuselage, the method comprising:
    securing the half barrel section of fuselage to a track such that a concavity of the half barrel section faces a factory floor, and bearing edges of the half barrel section contact the track;
    a drive unit micropulsing the half barrel section along the track in a process direction;
    enforcing an inner mold line and an outer mold line on a piecewise portion of the half barrel section via:
        a first arch comprising first wheels extending from the first arch enforcing a desired contour upon the inner mold line; and
        a second arch further comprising second wheels descending from the second arch and enforcing a desired contour upon the outer mold line to define a desired contour for the half barrel section; and
    performing work on the piecewise portion of the half barrel section while the inner mold line and outer mold line are enforced.

12. The method according to claim 11, wherein performing work comprises attaching at least one structural component to the half barrel section to retain the desired contour, the at least one structural component comprising at least one of a frame, a window surround, and a door surround.

13. A fuselage assembly system that comprises:
    a track configured to engage bearing edges of a half barrel section of a fuselage;
    a drive unit configured to move the half barrel sections along the track;
    a first arch that comprises a shape complementary to an inner mold line of the half barrel section;
    a second arch that comprises a shape complementary to an outer mold line of the half barrel section; and
    a plurality of wheels including a first portion of wheels disposed about said first arch and extendable with respect to said first arch to engage the inner mold line, and a second portion of wheels disposed about said second arch and extendable with respect to said second arch to engage the outer mold line the first portion of wheels configured to change their position with respect to a leading edge of the half barrel section and to extend away from the first arch and enforce a desired contour for the leading edge of the half barrel section.

14. A fuselage assembly system that comprises:
    a track configured to engage bearing edges of a half barrel section of a fuselage;
    a drive unit configured to move the half barrel sections along the track;
    an indexing unit configured to recognize, via at least one indexing feature in the half barrel section, that a relevant portion of the half barrel section is indexed to a placement point;
    a first arch that comprises first wheels configured to extend the first wheels from the first arch and enforce a desired contour of an inner mold line of the half barrel section;

a second arch that comprises second wheels configured to descend from the second arch and enforce a desired contour of an outer mold line of the half barrel section; and a traveling workstation configured to couple to the half barrel section, the traveling workstation configured to perform work on the half barrel section during one or more micro pulses and pauses between micro pulses of the half barrel section along the track.

15. A fuselage assembly system that comprises:

a track configured to engage bearing edges of a half barrel section of a fuselage;

a drive unit configured to move the half barrel sections along the track;

an indexing unit configured to recognize, via at least one indexing feature in the half barrel section, that a relevant portion of the half barrel section is indexed to a placement point;

a first arch that comprises first wheels configured to extend the first wheels from the first arch and enforce a desired contour of an inner mold line of the half barrel section;

a second arch that comprises second wheels configured to descend from the second arch and enforce a desired contour of an outer mold line of the half barrel section;

a workstation configured to temporarily attach a component to the half barrel section; and a traveling workstation configured to be coupled to the half barrel section, the traveling workstation configured to fasten the component to the half barrel section during one or more micro pulses and pauses between micro pulses of the half barrel section along the track.

\* \* \* \* \*